(12) United States Patent
O'Neill et al.

(10) Patent No.: US 6,331,028 B1
(45) Date of Patent: Dec. 18, 2001

(54) FIBER-REINFORCED COMPOSITE STRUCTURE

(75) Inventors: Michael A. O'Neill, Stonington; Wayne D. Kirk, Old Lyme; Stuart C. Simmons, North Branford; Paul Trudeau, Old Lyme; Jonathan W. Bremmer, Portland, all of CT (US)

(73) Assignee: Advance USA, Inc., Old Lyme, CT (US)

( * ) Notice: Subject to any disclaimer, the term of this patent is extended or adjusted under 35 U.S.C. 154(b) by 0 days.

(21) Appl. No.: 09/690,338

(22) Filed: Oct. 17, 2000

(51) Int. Cl.$^7$ .................................................. B60P 7/02
(52) U.S. Cl. ............... 296/100; 296/100.01; 296/100.02; 428/71
(58) Field of Search .............................. 296/100, 100.01, 296/160.02; 428/71

(56) References Cited

U.S. PATENT DOCUMENTS

| | | | |
|---|---|---|---|
| 3,493,449 | | 2/1970 | Krug ....................................... 156/79 |
| 4,025,686 | * | 5/1977 | Zion ....................................... 428/310 |
| 4,296,213 | | 10/1981 | Cuscurida et al. .................... 521/166 |
| 4,327,136 | * | 4/1982 | Thompson et al. .................... 428/35 |
| 4,339,487 | * | 7/1982 | Mullet ..................................... 428/71 |
| 4,390,581 | * | 6/1983 | Cogswell et al. ....................... 428/71 |
| 4,518,778 | | 5/1985 | Cuscurida ............................ 544/398 |
| 4,565,723 | * | 1/1986 | Hirsch ..................................... 428/71 |
| 4,590,219 | | 5/1986 | Nissen et al. .......................... 521/51 |
| 4,722,946 | | 2/1988 | Hostrttler ............................... 521/158 |

(List continued on next page.)

FOREIGN PATENT DOCUMENTS

| | | | |
|---|---|---|---|
| 1453258 | 10/1976 | (GB) | ............................. C08L/75/02 |
| 1482213 | 8/1977 | (GB) | ............................. C08F/283/06 |

OTHER PUBLICATIONS

Herrington, et al., Chapter 2 Basic Chemistry, *Flexible Polyurethane Foams*, The Dow Chemical Company, 1991.

Primary Examiner—Joseph D. Pape
Assistant Examiner—Kiran B. Patel
(74) Attorney, Agent, or Firm—Cummings & Lockwood

(57) ABSTRACT

A fiber-reinforced composite structure has two molded outer polymeric layers spaced apart from each other and defining a cavity therebetween. Each molded outer polymeric layer defines a sealing surface extending about a periphery of the respective layer, and the opposing sealing surfaces cooperate to define a hermetic seal extending about a periphery of the cavity. One or more multi-directional fiber reinforcement layers are adhesively attached in a discontinuous manner to each outer polymeric layer, and define a first region of the cavity extending between each respective outer polymeric layer and adjacent fiber reinforcement layer, and a second region of the cavity extending between the fiber reinforcement layers. A core is located between the two outer polymeric layers, and is made of a resinous core material capable of exhibiting a foamed character and a resinous character. The resinous core material has a blowing agent activatable upon exposure to a predetermined vacuum pressure within the cavity to convert the core material within the second region of the cavity from a resinous character to a foamed character and thereby fill the second region of the cavity with the foamed core material. Each multi-directional fiber reinforcement layer is impregnated with the core material exhibiting a relatively dense, resinous character, and each first region of the cavity is substantially filled with the core material exhibiting a resinous character to fixedly secure the multi-directional fiber reinforcement layers to the outer polymeric layers. A structural insert, such as a rigid plate adapted to receive fasteners, is embedded within the core material for attaching other devices or structures thereto.

4 Claims, 21 Drawing Sheets

U.S. PATENT DOCUMENTS

| | | | |
|---|---|---|---|
| 4,734,230 | | 3/1988 | Rhodes, Jr. et al. ............. 264/46.4 |
| 4,753,837 | | 6/1988 | Hanusa ................................ 428/86 |
| 4,813,735 | * | 3/1989 | Avitable ............................ 296/100 |
| 4,857,380 | | 8/1989 | Kent ................................... 428/117 |
| 4,910,067 | | 3/1990 | O'Neill .............................. 428/139 |
| 4,994,502 | | 2/1991 | Markovs et al. ................... 521/137 |
| 5,041,318 | * | 8/1991 | Hulls ................................... 428/57 |
| 5,169,574 | | 12/1992 | Leung et al. ....................... 264/40.5 |
| 5,173,226 | | 12/1992 | Cazaillon et al. ................. 264/46.6 |
| 5,180,617 | | 1/1993 | Takeuchi et al. ................... 428/71 |
| 5,230,844 | | 7/1993 | Macaire et al. .................... 264/46.7 |
| 5,275,860 | * | 1/1994 | D'Luzansky et al. ............... 428/71 |
| 5,306,548 | | 4/1994 | Zabrocki et al. ................... 428/215 |
| 5,334,450 | | 8/1994 | Zabrocki et al. ................... 428/332 |
| 5,407,575 | * | 4/1995 | Vinsonhaler ........................ 428/71 |
| 5,429,784 | | 7/1995 | Iannazzi et al. .................... 264/126 |
| 5,433,165 | | 7/1995 | McGuiness et al. ............... 114/357 |
| 5,476,618 | | 12/1995 | Ito et al. ............................. 264/45.4 |
| 5,526,767 | | 6/1996 | McGuiness et al. ............... 114/357 |
| 5,588,392 | | 12/1996 | Bailey ................................ 114/357 |
| 5,601,680 | * | 2/1997 | Kuszaj et al. ...................... 156/242 |
| 5,641,439 | | 6/1997 | Rogerson ........................... 264/46.4 |
| 5,741,574 | | 4/1998 | Boyce et al. ....................... 428/119 |
| 5,743,586 | * | 4/1998 | Nett .................................... 296/100 |
| 5,756,406 | | 5/1998 | Rittman et al. .................... 442/117 |
| 5,766,719 | * | 6/1998 | Rimkus ............................... 428/71 |
| 5,824,249 | | 10/1998 | Leitch et al. ....................... 264/219 |
| 5,851,624 | | 12/1998 | Ang et al. ............................ 428/68 |
| 5,853,649 | | 12/1998 | Tisack et al. ....................... 264/446 |
| 5,857,729 | * | 1/1999 | Bogard .......................... 296/100.02 |
| 5,885,662 | | 3/1999 | Gardner, Jr. ....................... 427/426 |
| 5,908,591 | | 6/1999 | Lewit et al. ........................ 264/46.4 |
| 5,916,672 | | 6/1999 | Reeves et al. ................... 428/319.9 |
| 5,922,431 | * | 7/1999 | Funato et al. ....................... 428/71 |
| 5,932,331 | | 8/1999 | Jones et al. ........................ 428/218 |
| 5,939,165 | * | 8/1999 | Oike et al. ........................... 428/71 |
| 5,945,200 | * | 8/1999 | Suzuki ................................. 428/71 |
| 5,972,260 | | 10/1999 | Manni ................................ 264/46.5 |
| 6,004,123 | * | 12/1999 | Buckley et al. ................... 425/174.4 |
| 6,068,907 | * | 5/2000 | Beauregard ......................... 428/71 |
| 6,126,225 | * | 10/2000 | Griffin .......................... 296/100.02 |
| 6,224,706 | * | 5/2001 | Matich ................................ 428/71 |

\* cited by examiner

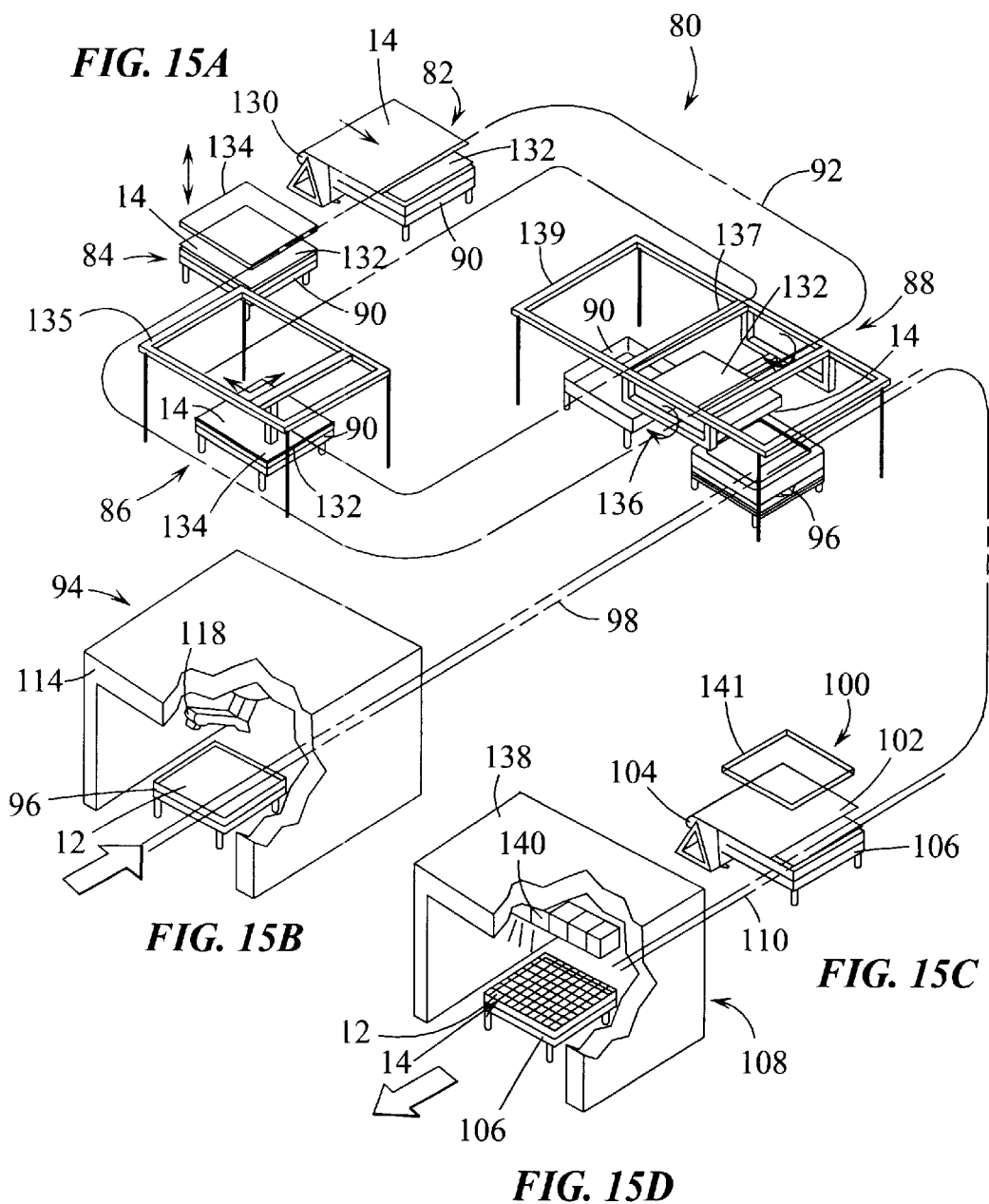

FIBER-REINFORCED COMPOSITE STRUCTURE

FIELD OF THE INVENTION

The present invention relates to composite fiber-reinforced polymeric structures, and more particularly, to composite fiber-reinforced polymeric structures having at least two polymeric sheets in opposed spaced relationship such that a cavity is formed therebetween, at least one fibrous reinforcing layer bonded to the inner surface of at least one of the polymeric sheets, and a polymeric core material introduced under vacuum into the cavity between the polymeric sheets. The polymeric core material exhibits a resinous character in the region of the fibrous reinforcing layer to impregnate the fibrous layer and adhere the fibrous layer to the adjacent polymeric sheet, and exhibits a foamed character defined by a multiplicity of foam cells in the region on the opposite side of the fibrous layer relative to the polymeric sheet. The present invention is particularly suitable for forming relatively large composite structures, such as structural components for automobiles, trucks, recreational vehicles, and boats.

BACKGROUND INFORMATION

Composite structures comprising polymeric outer layers and fiber-reinforced foam cores are known in the prior art. For example, U.S. Pat. No. 4,910,067 assigned to the Assignee of the present invention ("the '067 patent"), discloses a structural composite comprising polymeric outer layers, a layer of fibrous material, and a foam core. It also has been known in the prior art to manufacture this type of composite structure with two polymeric layers, two fibrous layers wherein each fibrous layer is adhesively attached to an inner wall of a respective polymeric layer, and the foam core disposed within the space between the fibrous layers. The polymeric material of the foam core exhibited both a resinous and a foaming character, such that the resinous core material penetrated the fibrous layers, and the foamed core material filled the space between the fibrous layers.

The '067 patent further discloses a method of manufacturing a structural composite comprising the steps of: forming a polymeric layer into a desired shape; treating the surface of the polymeric layer by etching and oxidation; transferring the polymeric layer to a molding surface of a mold; adhesively attaching a layer of fibrous reinforcement to an opposing molding surface of a mold; mating the molding surfaces within the mold to form a cavity therebetween; injecting a foamable polymer into the cavity; permitting the foam to expand and thereby form a fiber-reinforced polymeric composite structure; and curing the structure in the mold. Alternatively, in order to promote the penetration of the fibrous reinforcement by the foam in a resinous state, the '067 patent further discloses that the layer of fiber can be treated with a defoaming agent capable of converting the foamable polymer to a liquid.

One drawback associated with these prior art structural composites, and methods of manufacturing such structural composites, is that the relatively viscous core materials cannot rapidly fill the cavity formed between the outer polymeric layers, and moreover, cannot rapidly and fully penetrate or impregnate the fibrous layers. Accordingly, such prior art structural composites have employed only relatively lightweight, unidirectional fibrous layers, that can be more easily penetrated (or "wetted out") by the relatively viscous core materials in comparison to heavier, multi-directional fiber reinforcement layers. As a result, such prior art composite structures tend to be relatively weaker than otherwise desired and cannot be used to form primary structural parts or components. In addition, such prior art composite structures and methods have not proven to be cost effective for manufacturing parts in substantial quantities due to the relatively high cycle times required to allow the foam to expand, fill the core, and penetrate the fibrous layers.

Several other methods are known for manufacturing structural composites in various sizes and volumes for use in a number of technical fields and industries, including the automotive, marine, agricultural and recreational machinery, construction and manufactured housing, and industrial enclosure fields and industries. For example, U.S. Pat. No. 5,588,392 to Bailey shows a resin transfer molding process for manufacturing a fiber-reinforced plastic boat hull; U.S. Pat. No. 5,853,649 to Tisack et al. shows a method for manufacturing an interior automotive foam panel using a radio frequency electric field to promote bonding of the foam to the substrate; and U.S Pat. No. 5,972,260 to Manni shows a process for vacuum forming polyurethane mixed with a pentane blowing agent to manufacture flat insulating panels.

Each process and associated composite structure described above and elsewhere in the prior art is uniquely suited for distinctively different segments of various markets based upon the size of the finished part and the volume of demand for the finished part. Some processes and associated composite structures are uniquely suited for producing large parts in low volumes, while other processes and structures are uniquely suited for producing small parts in high volumes. As production volumes increase, the complexity of the machinery involved, and the corresponding pressure applied to that machinery, necessarily increases. Accordingly, when employing these prior art processes and composite structures, the size of a part that can be formed in relatively high volumes correspondingly decreases because of the processing difficulties associated with molding relatively large parts under relatively higher pressures.

For example, it is known in the prior art to employ a fiberglass "spray-up" technology to form large parts having surface areas in the range of about 50–200 square feet. However, this technology has not proven to be economically feasible for producing high volumes of parts, such as in excess of 5,000 parts. Instead, resin transfer molding frequently has been used in the prior art to form relatively smaller parts in relatively higher volumes. For example, resin transfer molding typically has been used to manufacture parts having surface areas in the range of about 5–50 square feet, and in volumes of about 5,000–20,000 parts. Similarly, compression molding has been used in the prior art to form relatively smaller parts in relatively higher volumes. For example, compression molding typically has been used to manufacture parts having surface areas less than about 10 square feet, and in volumes of about 25,000–50,000 parts. To form parts in volumes greater than 50,000, the prior art typically has employed injection molding processes. Such processes, however, are generally limited to producing relatively smaller parts in comparison to the above-described processes.

Accordingly, one drawback associated with these and other prior art processes and associated structural composites is the inability to manufacture relatively large parts, such as parts having surface areas greater than about 25 square feet, in relatively high volumes, in a commercially feasible manner.

Another drawback associated with these and other prior processes and associated structural composites, particularly fiber-reinforced polymeric composites with foam cores, is the difficulty in forming relatively large, thin-walled products that retain the composite's strength as well as a high-grade, cosmetic, impact and chemical resistant, weatherable exposed surface.

Accordingly, it is an object of the present invention to overcome one or more of the above described and other drawbacks and disadvantages of the prior art, and to provide a composite structure that may be employed to form relatively large parts in relatively high volumes while exhibiting reduced cycle times in the manufacture thereof and improved strength.

SUMMARY OF THE INVENTION

The present invention is directed to a composite structure, such as a tonneau or other part for a motor vehicle, comprising two molded outer polymeric layers spaced apart from each other and defining a cavity therebetween. Each molded outer polymeric layer defines a sealing surface extending about a periphery of the respective layer, and the opposing sealing surfaces cooperate to define a hermetic seal extending about a periphery of the cavity. The composite structure further comprises at least two multi-directional fiber reinforcement layers, wherein each multi-directional fiber reinforcement layer is mounted adjacent to a respective outer polymeric layer and defines a first region of the cavity extending between each respective outer polymeric layer and adjacent fiber reinforcement layer, and a second region of the cavity extending between the fiber reinforcement layers. A core is located between the two outer polymeric layers and is made of a core material capable of exhibiting a foamed character and a resinous character. The core material includes a resin and a blowing agent activatable upon exposure to a predetermined vacuum pressure within the cavity to convert the core material within the second region of the cavity from a resinous character to a foamed character. The foamed core material substantially fills the second region of the cavity, and each multi-directional fiber reinforcement layer is impregnated with the core material exhibiting a relatively dense, resinous character. Each first region of the cavity is substantially filled with the core material exhibiting a resinous character, and the resinous core material fixedly secures the multi-directional fiber reinforcement layers to the outer polymeric layers.

One advantage of the present invention is that the relatively low-viscosity core material includes a blowing agent that is activatable upon exposure to a predetermined vacuum pressure within the cavity to thereby rapidly fill the second region of the cavity with the foamed core material, and in turn create a relatively dense, resinous interface between each fibrous layer and the foamed core. Then, the catalytic reaction in the core material cooperates with the vacuum pressure within the cavity to create negative pressure gradients that cause the relatively dense, resinous interface formed between each fibrous layer and the foamed core to rapidly impregnate the fibrous layers, fill the first regions of the cavity, and bond the fibrous material to the polymeric sheet(s). As a result, the cycle times required to manufacture the composite structures of the present invention are significantly reduced in comparison to that of the above-described prior art processes and structures.

Yet another advantage of the present invention is that the preferred, relatively low viscosity core materials cooperate with the vacuum within the cavity to allow the resinous core to rapidly and fully impregnate (or "wet out") the fiber reinforcement layers, and in turn cause the composite structures of the present invention to be significantly stronger, and to have significantly improved strength-to-weight ratios in comparison to the above-described prior art structures. The composite structures of the present invention are therefore particularly advantageous for forming relatively large, thin-walled parts, in high volumes and in a commercially feasible manner, that exhibit improved strength in comparison to the above-mentioned prior art composite structures, as well as high-grade, cosmetically-appealing, impact and chemical resistant, and/or weatherable exposed surfaces. Accordingly, the composite structures of the present invention are particularly applicable to the manufacture of components for automobiles and trucks, including, for example, tonneaus for pick-up trucks, hard tops for automobiles and sports utility vehicles ("SUVs"), and other relatively large parts for trucks, vans and recreational vehicles.

Other advantages of the present invention will become apparent in view of the following detailed description and accompanying drawings.

BRIEF DESCRIPTION OF THE DRAWINGS

FIG. 15A is a somewhat schematic, perspective illustration of an apparatus embodying the present invention for sizing the fibrous layers and preparing them for adhesion to the polymeric layers in the composite structures of the invention.

FIG. 15B is a somewhat schematic, perspective illustration of an apparatus embodying the present invention for applying adhesives to the polymeric sheets, and preparing and applying fibrous materials to the adhesive-containing sheets in the manufacture of the composite structures of the present invention.

FIG. 15C is a somewhat schematic, perspective illustration of an apparatus embodying the present invention for enclosing the sub-assemblies consisting of the fibrous layers superimposed on the adhesive-containing polymeric sheets, and for evacuating the enclosures to press the fibrous layers against the adhesive-containing polymeric sheets.

FIG. 15D is a somewhat schematic, perspective illustration of an apparatus embodying the present invention for transmitting radiation through the enclosures and, in turn, curing the adhesive to secure the fibrous layers to the polymeric sheets.

DETAILED DESCRIPTION OF THE PREFERRED EMBODIMENTS

Figure 1:
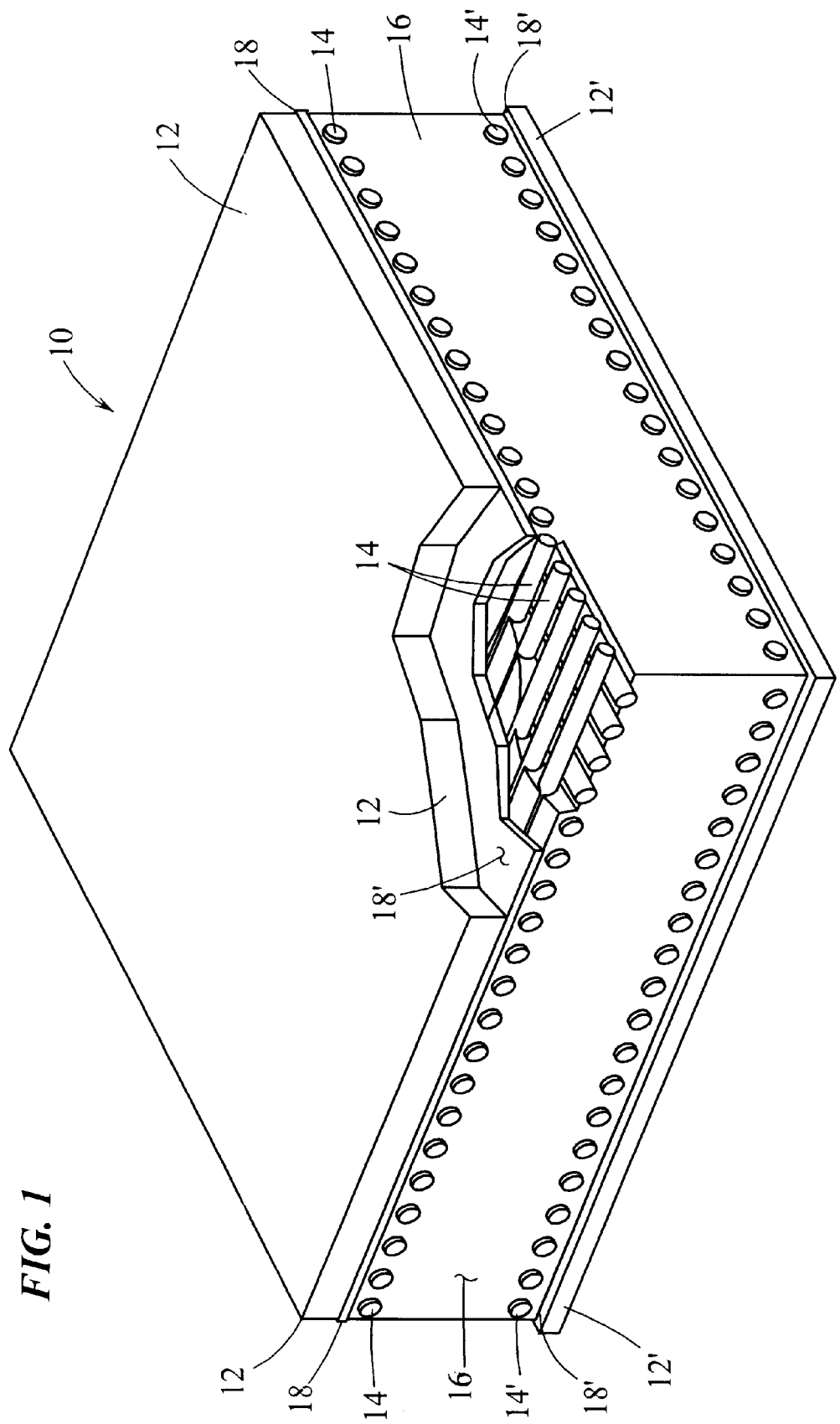
FIG. 1 is a somewhat schematic, partially cut-away, perspective illustration of a composite fiber-reinforced polymeric structure embodying the present invention.

In FIG. 1, a composite fiber-reinforced polymeric structure embodying the present invention is indicated generally by the reference numeral 10. The composite structure 10 comprises two outer polymeric layers 12, 12' spaced apart from each other and defining a cavity therebetween. Two fibrous layers 14, 14' are each secured to a respective outer polymeric layer 12, 12', and a foam core 16 extends between the two fibrous layers. Two resinous layers 18, 18' made of the core material are each located between a respective outer polymeric layer 12, 12' and adjacent fibrous layer 14, 14' to fixedly secure the fibrous layers to the outer polymeric layers.

Figure 2A:
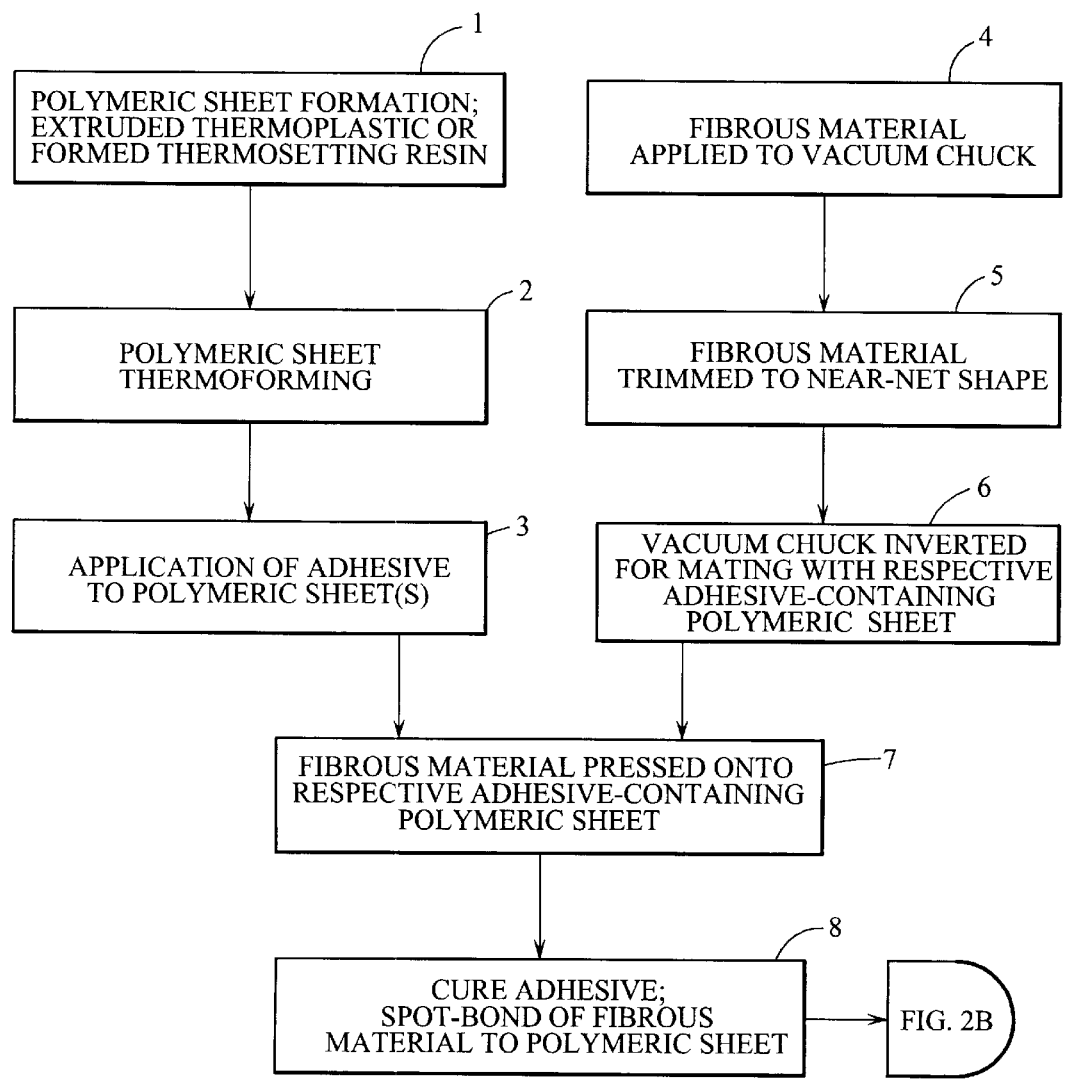
FIGS. 2A and 2B are a flow chart illustrating conceptually the procedural steps for forming a composite fiber-reinforced polymeric structure in accordance with a method of the present invention.
Figure 2B:
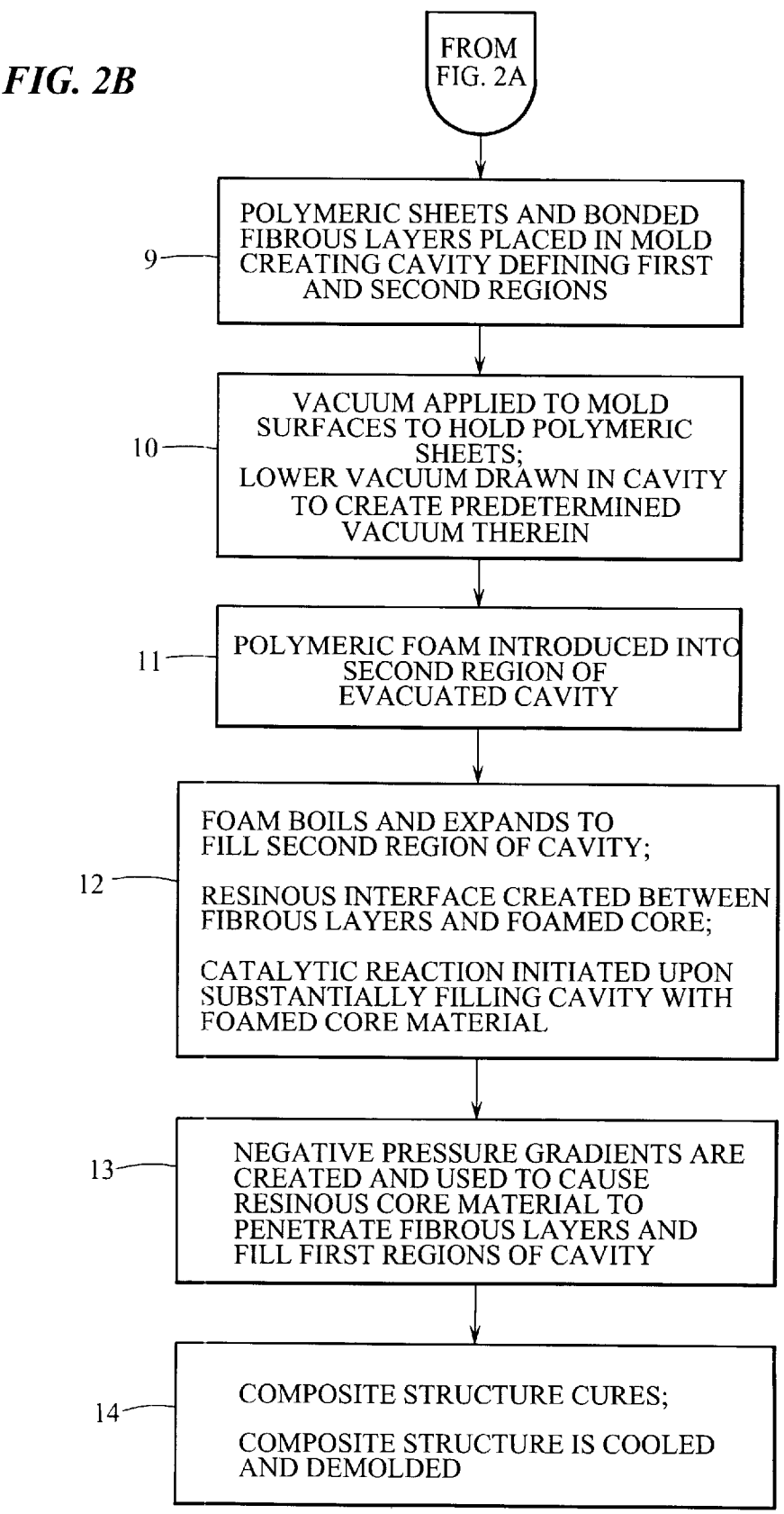

Turning to FIGS. 2A and 2B, a preferred method of forming the composite fiber-reinforced polymeric structures 10 in accordance with the present invention involves in step 1 providing the outer polymeric sheets 12, 12'. In the currently preferred embodiment of the present invention, the outer polymeric sheets 12, 12' are manufactured from any of numerous different thermoplastics or thermoset resins. However, as may be recognized by those of ordinary skill in the pertinent art based on the teachings herein, the outer polymeric layers 12, 12' may be made of any of numerous other polymeric materials that are currently, or later become known for performing one or more of the functions of the outer polymeric sheets described herein. In step 2, the outer polymeric sheets 12, 12' are thermoformed or otherwise formed into a desired three-dimensional shape, and in step 3, an adhesive is applied to each polymeric sheet 12, 12' intended to receive a respective fibrous layer 14, 14'. In steps 4, 5, and 6, respectively, each fibrous layer 14, 14' is applied to a vacuum chuck that holds the respective fibrous layer for further processing, each fibrous layer 14, 14' is trimmed to a near-net shape, and then the vacuum chuck is inverted and held for mating with the respective adhesive-containing outer polymeric sheet 12, 12'. If desired, steps 1, 2, and 3 can be performed concurrently with steps 4, 5, and 6 to reduce the overall process cycle time. In step 7, each layer of fibrous material 14, 14' is pressed onto the respective adhesive-containing polymeric sheet 12, 12'. Each sub-assembly consisting of an outer polymeric sheet 12, 12' and respective fibrous layer 14, 14' is then transferred into a curing station to intermittently bond the fibrous layers to the polymeric sheets, as described in further detail below.

Turning to FIG. 2B, in step 9 the polymeric sheets 12, 12' and the respective fibrous layers 14, 14' bonded thereto are placed in opposed spaced relation in a mold to define a cavity therebetween. As shown in the preferred embodiment of FIG. 1, the cavity defines two first regions, each extending between a respective fibrous layer 14, 14' and adjacent outer polymeric layer 12, 12'. Each first region receives a respective resinous layer 18, 18' consisting of the core material 16 in its resinous state to fixedly attach each fibrous layer to the respective outer polymeric layer. As also shown in FIG. 1, the cavity defines a second region located on the opposite side of each fibrous layer 14, 14' relative to each first region for receiving the core material 16 in its foamed state. In step 10, a vacuum is applied to the mold surfaces to hold the polymeric sheets 12, 12' against the mold surfaces, and a lesser vacuum is drawn within the cavity between the outer polymeric sheets to create a predetermined vacuum therein.

As indicated by step 11, the polymeric core material 16 is introduced in a resinous character into the second region of the evacuated cavity. As indicated in step 12, a blowing agent of the core material 16 is then activated upon exposure to the predetermined vacuum within the cavity to, in turn, convert the core material in the second region from a resinous character to a foamed character. Thus, upon introduction into the evacuated cavity, the core material "boils" and rapidly fills the second region of the cavity. As further indicated in step 12, upon substantially filling the second region of the cavity, the core material 16 that contacts the fibrous layers 14, 14' is re-converted from its foamed character to a substantially resinous character to create a relatively dense, resinous interface between each fibrous layer 14, 14' and the foamed core 16. Then, after substantially filling the second region of the cavity with the foamed core material, a catalytic reaction is initiated within the foamed core 16 to cure the foamed core. As indicated in step 13, negative pressure gradients also are then created in the direction from an approximate central area of the foamed core 16 toward the fibrous layers 14, 14'. In the preferred embodiment of the present invention, the negative pressure gradients are created by maintaining the predetermined vacuum within the cavity and increasing the pressure in a central area of the foamed core 16 through the catalytic reaction of the core material. The negative pressure gradients are then used to cause the resinous core material at the interface of each fibrous layer 14, 14' and the foamed core 16 to penetrate the fibrous layers and, in turn, substantially fill the first regions of the cavity to form the resinous layers 18, 18'. As indicated by step 14, the resinous layers 18, 18' are then cured to fixedly secure the fibrous layers 14, 14' to the outer polymeric layers 12, 12'. Upon curing, the composite structure 10 is then cooled and demolded.

Formation of the Outer Polymeric Sheets

As indicated above, the polymeric sheets 12, 12' are formed into or otherwise provided in a desired shape. In the currently preferred embodiments, the polymeric sheets comprise either a thermoplastic or a thermoset resin material, each having associated advantages and disadvantages known to those of ordinary skill in the pertinent art. In addition, depending upon the ultimate application of the composite structure 10 and/or other considerations, the polymeric sheets 12, 12' can be made of the same or different materials. The selection of the materials used to form the polymeric sheets 12, 12' may further depend, in part, upon a preferred manufacturing method, or the use of an existing manufacturing capability to minimize manufacturing costs. The polymeric sheets 12, 12' may be formed into their desired shapes by any of numerous different molding processes that are currently, or later become known to those of ordinary skill in the pertinent art including, but not limited to, sheet extrusion, vacuum forming, injection molding, and the like. As described in further detail below, suitably formed polymeric sheets 12, 12' are subsequently placed onto opposed molding surfaces of a mold in order to form the composite structure 10. In a currently preferred embodiment of the present invention, the opposed molding surfaces protect the exposed surfaces of the polymeric sheets 12, 12' in contact with each molding surface, and further support and position the surfaces of the polymeric sheets for further processing.

The polymeric sheets 12, 12' each can be formed in one or more layers depending upon the properties ultimately sought to be exhibited by the composite structure 10. In a currently preferred embodiment of the present invention illustrated in FIGS. 3 and 4, the polymeric sheets 12, 12' are each formed from a combination of engineered thermoplastic materials that are laminated in a multilayered sheet extrusion apparatus 20.

Figures 3, 4:
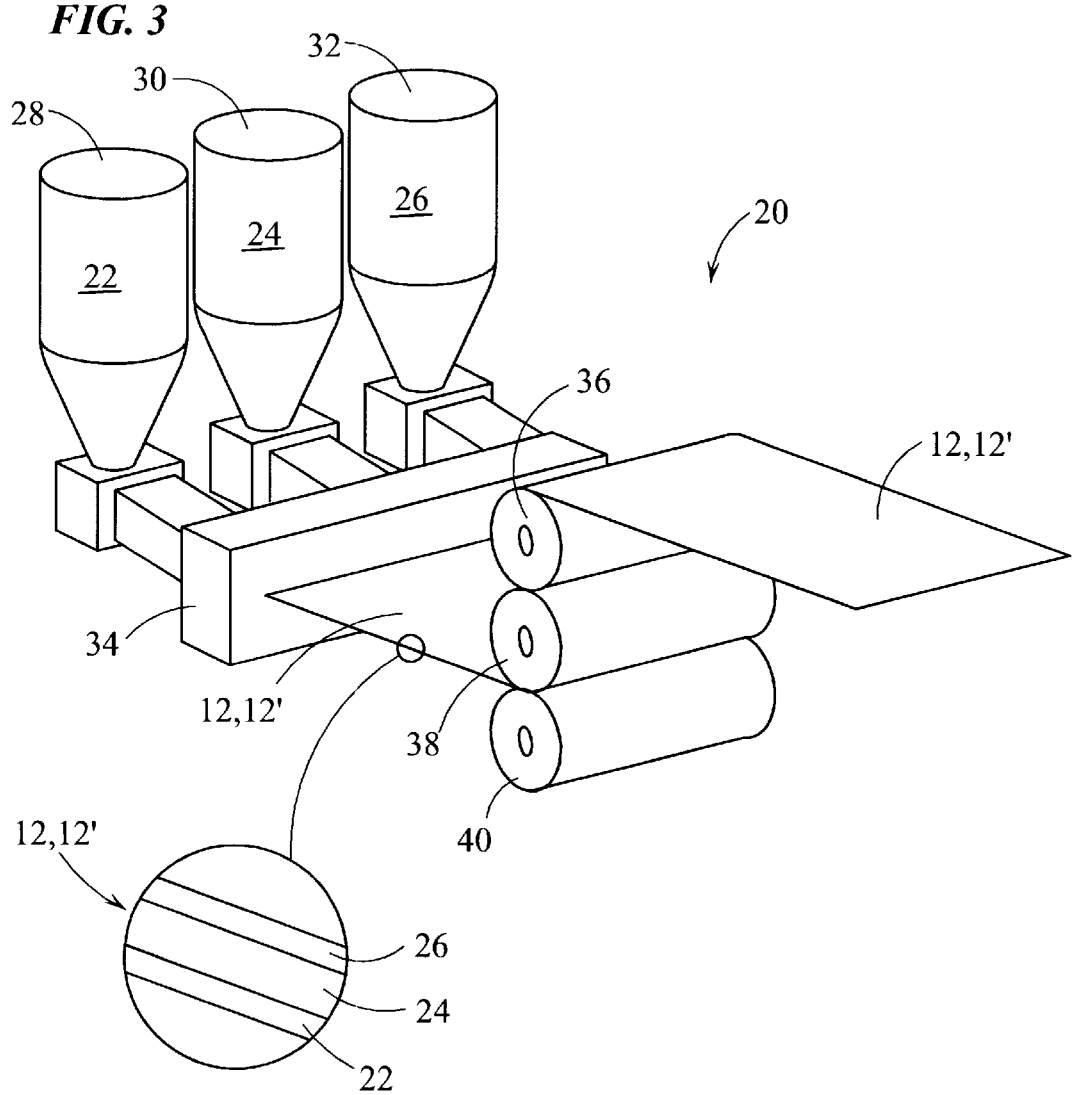
FIG. 3 is a somewhat schematic, perspective view of an exemplary apparatus for extruding the outer polymeric sheets employed in the composite structure of FIG. 1.
FIG. 4 is a partial, enlarged, side elevational view of an outer polymeric sheet formed in the apparatus of FIG. 3.

As shown in FIG. 3, each multilayered sheet 12, 12' comprises an outer surface 22, a core layer 24, and an inner surface 26.

The outer surface 22 provides a cosmetic surface that preferably defines one or more of color, surface finish, texture, and color effects, such as metal flake, wood grain, base clear, and pearlessence, and furthermore, preferably provides one or more of weatherability, abrasion resistance, and chemical resistance. In the currently preferred embodiment of the present invention, the outer surface 22 is made of Geloy™ ASA available from G.E. Plastics. However, as may be recognized by those of ordinary skill in the pertinent art based on the teachings herein, the outer surface 22 may be made from any of numerous different materials that are currently, or later become known for performing one or more of the functions of the outer surface 22 described herein, such as other types of ASA, PC-ASA, TEDLAR™, Paint Film, PVDF, KORAD™, TPA, P.P., T.P.O., SAN, PVC, Acrylonitril Butadiene Styrene ("ABS"), RIM, Polyurethane, and Polyester.

The core layer 24 comprises the bulk of each polymeric sheet 12, 12' and provides thermal stability, impact resistance, and modulus stiffness. In the currently preferred embodiment of the present invention, the core layer 24 is made from G.E. MC8100™ available from G.E. Plastics. However, as may be recognized by those of ordinary skill in the pertinent art based on the teachings herein, the core layer 24 can be manufactured from any of numerous different materials that are currently, or later become known for performing the functions described herein, such as any of numerous different high-temperature performance plastics, including ABS, PC-ABS, Thermoplastic Polyolefin ("TPO"), Polyamides, P.P., SAN, T.P.R., Nylon, and Polyester. To reduce material costs, the core layer can be formed from a combination of virgin high-temperature performance plastic and a predetermined percentage of the regrind of the high-temperature performance plastic leftover after trimming the finished product, as described further below. In the currently preferred embodiment of the present invention, the regrind constitutes less than approximately 20% by volume of the core layer 24; however, as may be recognized by those skilled the pertinent art based on the teachings herein, the percentage of regrind may vary depending upon cost constraints, performance requirements, and other considerations involved in manufacturing the composite structure 10.

The inner surface 26 provides a chemical-resistant, tie layer between the core layer 24 and polymeric core material 16 of the composite structure 10 (FIG. 1). Thus, the inner surface 26 must be chemically compatible with the polymeric core material 16 to effectively bond the outer polymeric layers 12, 12' to the core material. If, on the other hand, the material used to form the core layer 24 is chemically compatible with the polymeric core material 16, the inner surface 26 may be eliminated. In the currently preferred embodiment of the present invention, the inner surface 26 is made from GRM 2600 chemical-resistant ABS available from G.E. Plastics. However, as may be recognized by those of ordinary skill in the pertinent art based on the teachings herein, the inner surface 26 can be manufactured from any of numerous different materials that are currently, or later become known for performing the functions described herein, such as a chemical-resistant ABS, Acrylic, TPU, Polyester, Nylon, P.P., HDPE, or P.C.

As shown in FIG. 3, the engineered thermoplastic materials 22, 24, and 26 are extruded out of vented extruders 28, 30, and 32, respectively, into a multi-manifold die 34 that maintains precise control over the thickness of the constituent layers. The resultant polymeric sheet 12 or 12' is fed into a three-roll stack 36, 38, and 40 that controls gage and surface quality, and cools the polymeric sheet prior to cutting. In the current embodiment of the present invention, the thickness of the polymeric sheet ranges from approximately 0.010 inch to approximately 0.156 inch. However, as may be recognized by those skilled in the pertinent art based on the teachings herein, the polymeric sheets may be formed in any of numerous different thicknesses within or outside of this range depending upon the materials used and/or the performance requirements of a particular application of the composite structure 10.

As described above, in one embodiment of the invention, the polymeric sheets 12, 12' comprise a cosmetic outer layer, a chemical-resistant inner layer, and a core layer. One advantage of this embodiment is that color, texture, color effects, and a "Class A" surface quality can be directly manufactured in the polymeric sheets 12, 12' to thereby provide a molded and colored sheet desirable for automotive and other applications heretofore unavailable. Another advantage of this embodiment of the invention is that the polymeric sheets 12, 12' can be bonded to a polymeric foam, e.g., polyurethane foam. The chemical-resistant inner surface 26 provides a plurality of receptor sites for bonding with polyurethane foams, and also withstands the typical blowing agents employed with such polyurethane foams, as described further below.

In another embodiment of the invention, the polymeric sheets 12, 12' forming the outer layers of the composite structure 10 are made from a thermosetting resin or combination thereof. In a currently preferred embodiment of the present invention, the polymeric sheets 12, 12' are made from P/E Spectrum™ RIM polyurethane available from Dow Chemical. However, as may be recognized by those of ordinary skill in the pertinent art based on the teachings herein, the polymeric sheets 12, 12' can be manufactured from any of numerous other types of thermosetting resins or combinations thereof for performing the functions of the outer polymeric layers described herein, including Polyurethane, Polyurethane RIM, DCPD, Mica-Filled RIM, Glass-Filled RIM, and Polyester Spray-up. When the outer polymeric layers are formed from such thermoset resins, the exposed surfaces can be painted in a conventional manner to provide a desired cosmetic finish, such as a "Class A" surface finish typically required for automotive applications.

The relative advantages and disadvantages of using thermoplastic or thermosetting resins to form the polymeric sheets 12, 12' are well recognized by those of ordinary skill in the pertinent art. For example, a cosmetically acceptable surface can be achieved during the manufacture of a thermoplastic polymeric sheet by embossing a texture into the sheet using a texture engraved roll 36, 38, and/or 40 in the three-roll stack shown in FIG. 3; or otherwise by manufacturing the outer surface with the desired color or color effect with a class A surface finish. A thermoset polymeric sheet, on the other hand, will likely require painting to achieve a like-quality surface finish. Alternatively, a thermoset sheet typically will permit use or further processing in higher temperature applications than will a thermoplastic sheet. Ultimately, the polymeric sheet 12 should exhibit cosmetic, lightweight, and high-strength characteristics to achieve the desired outer surface characteristics of the composite structure 10 of FIG. 1.

Shaping of the Outer Polymeric Sheets

Typically, the first polymeric sheet 12 is formed into a three-dimensional shape dictated by the ultimate application of the composite structure 10. The second polymeric sheet 12' typically is formed into a shape corresponding to that of the first polymeric sheet 12, or alternatively, can be formed into any other shape dictated by the ultimate application of the composite structure. However, regardless of their shapes, the first and second polymeric sheets 12, 12' must be adaptable to being placed in opposed spaced relation to each other and brought together to form a cavity therebetween, as described further below.

Turning to FIGS. 5–10, a composite structure embodying the present invention and forming a tonneau for a pick-up truck also is indicated generally by the reference numeral 10. As may be recognized by those skilled in the pertinent art, the teachings of the present invention will be applicable to any of numerous different types of composite structures, and/or applications for such structures. Accordingly, although the preferred embodiment is described herein with reference to a tonneau for a pick-up truck, the present invention is clearly not limited to such structures. Rather, the apparatus and method of the invention can be used to make virtually any type of composite structure having any desired shape.

Figure 5:
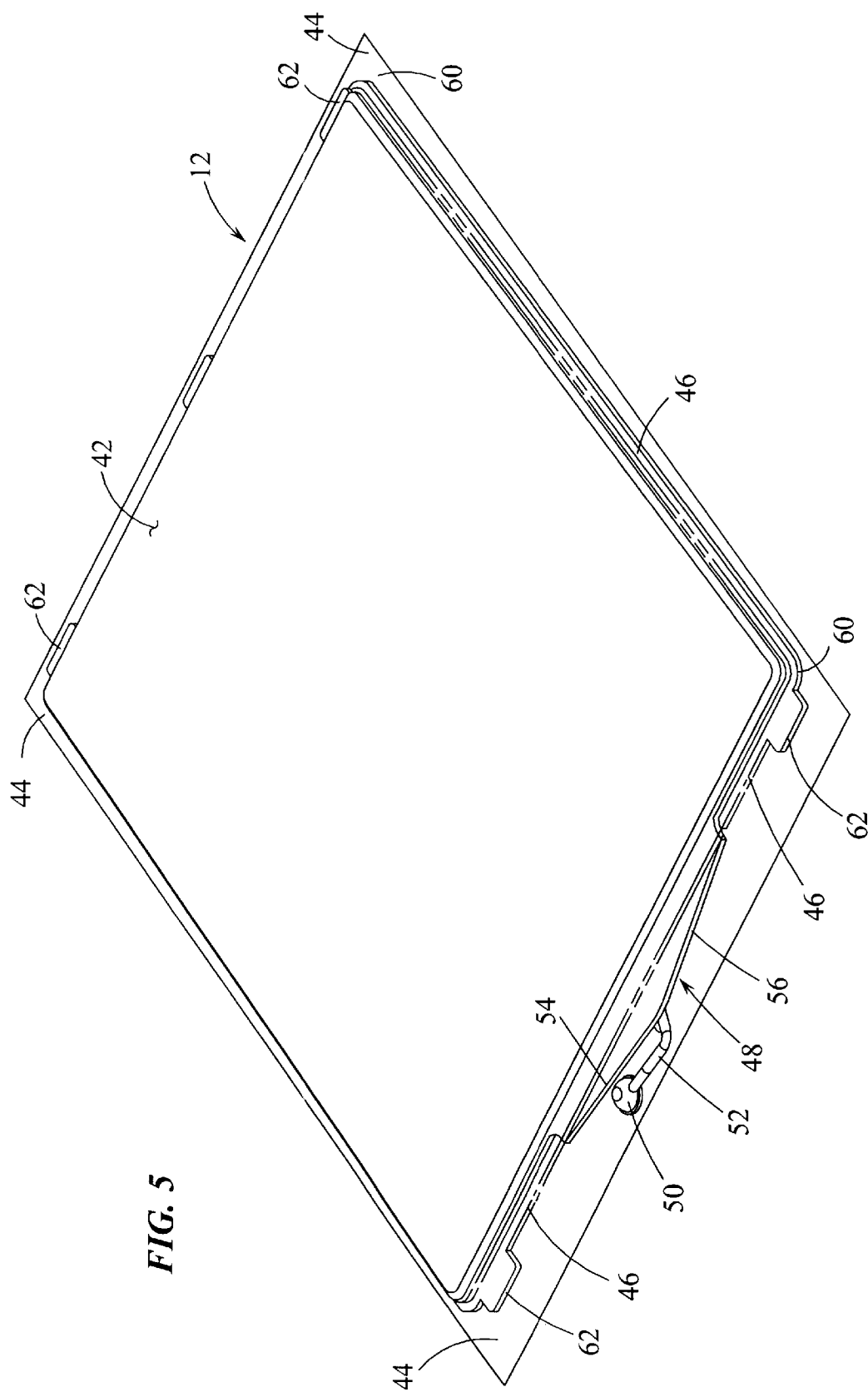
FIG. 5 is a top, perspective view of a first outer polymeric sheet of a composite structure embodying the present invention and forming a tonneau for a pick-up truck.
Figure 6:
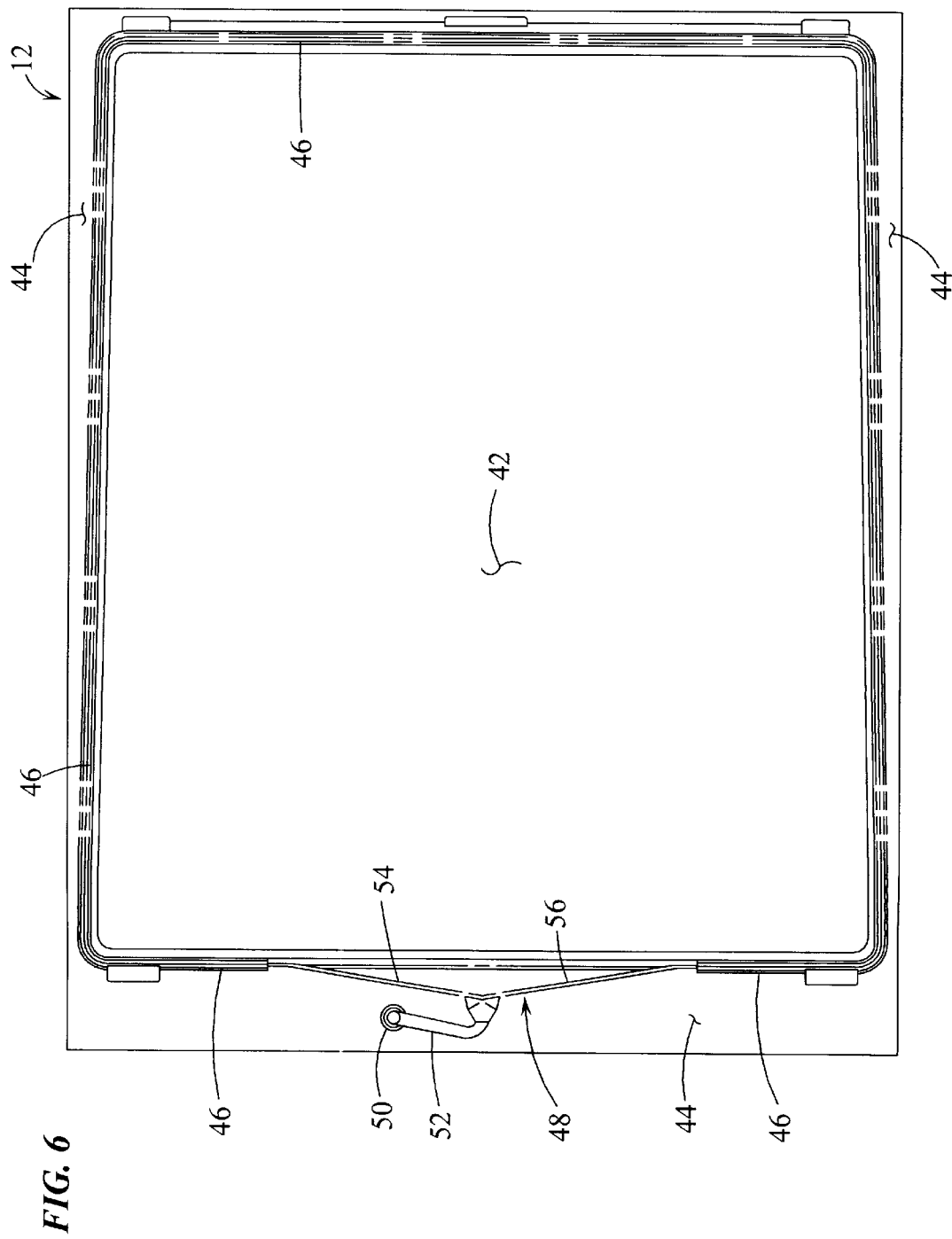
FIG. 6 is a top plan view of the outer polymeric sheet of FIG. 5.
Figure 7:
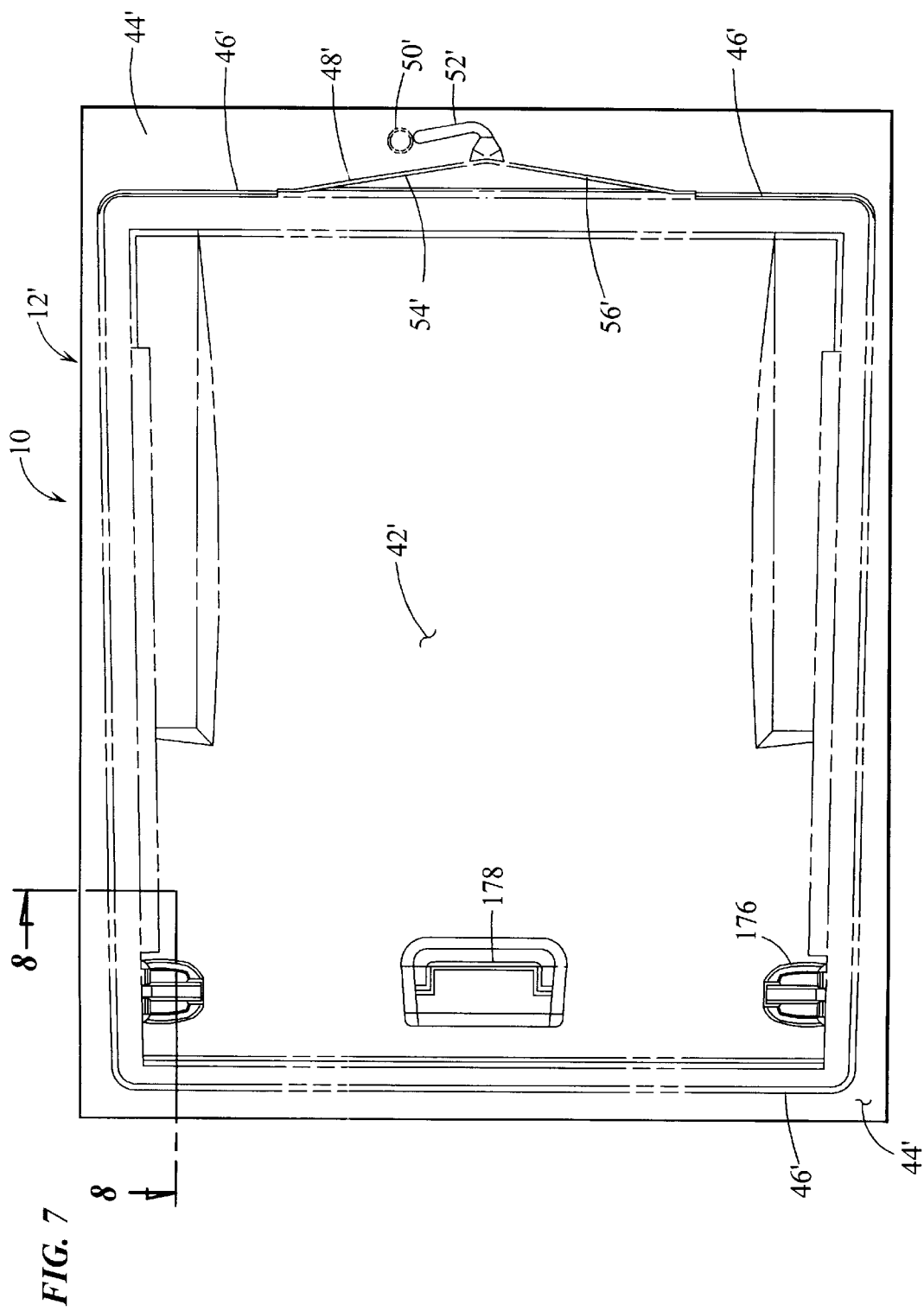
FIG. 7 is a plan view of a composite structure of the invention forming a tonneau for a pick-up truck and employing the outer polymeric sheet of FIGS. 5 and 6.

As shown in FIGS. 5 through 7, the first and second polymeric sheets 12 and 12', respectively, each define a relatively raised, central panel 42, 42', a relatively recessed flange or rim 44, 44' extending about the periphery of the central panel 42, 42', and a curved transitional region 46, 46' extending between the central panel and peripheral rim. The rim 44, 44' of each polymeric sheet 12, 12' further defines a gate 48, 48' extending between an outer peripheral portion of the rim and the respective curved transitional region 46, 46', an inlet port 50, 50', and an inlet conduit 52, 52' connected in fluid communication between the respective inlet port and gate. As shown typically in the drawings, each gate 48, 48' defines side walls 54, 54' and 56, 56' extending laterally outwardly from the inlet conduit at an acute angle relative to the adjacent edge of the respective rim 44, 44'.

As can be seen, when the outer polymeric sheets 12, 12' are superimposed over each other, the gates 48, 48', inlet ports 50, 50', and inlet conduits 52, 52' are aligned with each other to thereby form a unitary gate, inlet port and inlet conduit. Similarly, as shown typically in FIG. 8, a cavity 58 is formed between the outer polymeric sheets 12, 12' for receiving therein the polymeric core material 16. As shown typically in FIG. 8, the peripheral flange or rim 44, 44' of each polymeric sheet 12, 12' defines a sealing surface extending about the periphery of the respective layer. As described further below, the opposing sealing surfaces of the rims 44, 44' engage each other, or otherwise cooperate to define a hermetic seal extending about the periphery of the cavity to thereby allow the cavity to be evacuated to approximately a predetermined vacuum pressure prior to receiving therein the core material. As also described further below, one of the inlet ports 50, 50' is pierced to define a flow aperture therethrough, and an injection nozzle (not shown) is connected thereto to inject the core material 16 in a resinous state through the inlet port 50, 50, inlet conduit 52, 52' and gate 48, 48', and in turn into the cavity 58 to fill the cavity. As described above in connection with FIG. 1, the cavity 58 defines a first region extending between each fibrous layer 14, 14' and the respective outer polymeric sheet 12, 12', and a second region extending between the two fibrous layers. As described below, upon exiting the gate 48, 48', the core material 16 expands and substantially fills the second region of the cavity 58 in its foamed state, and subsequently penetrates (or "wets out") the fibrous layers 14, 14' and fills the first regions of the cavity in a relatively dense, resinous state. The shape and acute angle of the side walls 54, 54' and 56, 56' of the gates 48, 48' are selected in a manner known to those of ordinary skill in the pertinent art to cause the resinous core material 16 to transition from a turbulent flow upon exiting the inlet conduit 52, 52' to a substantially laminar flow upon exiting the gate 48, 48' and entering the second region of the cavity 58.

Figure 8:
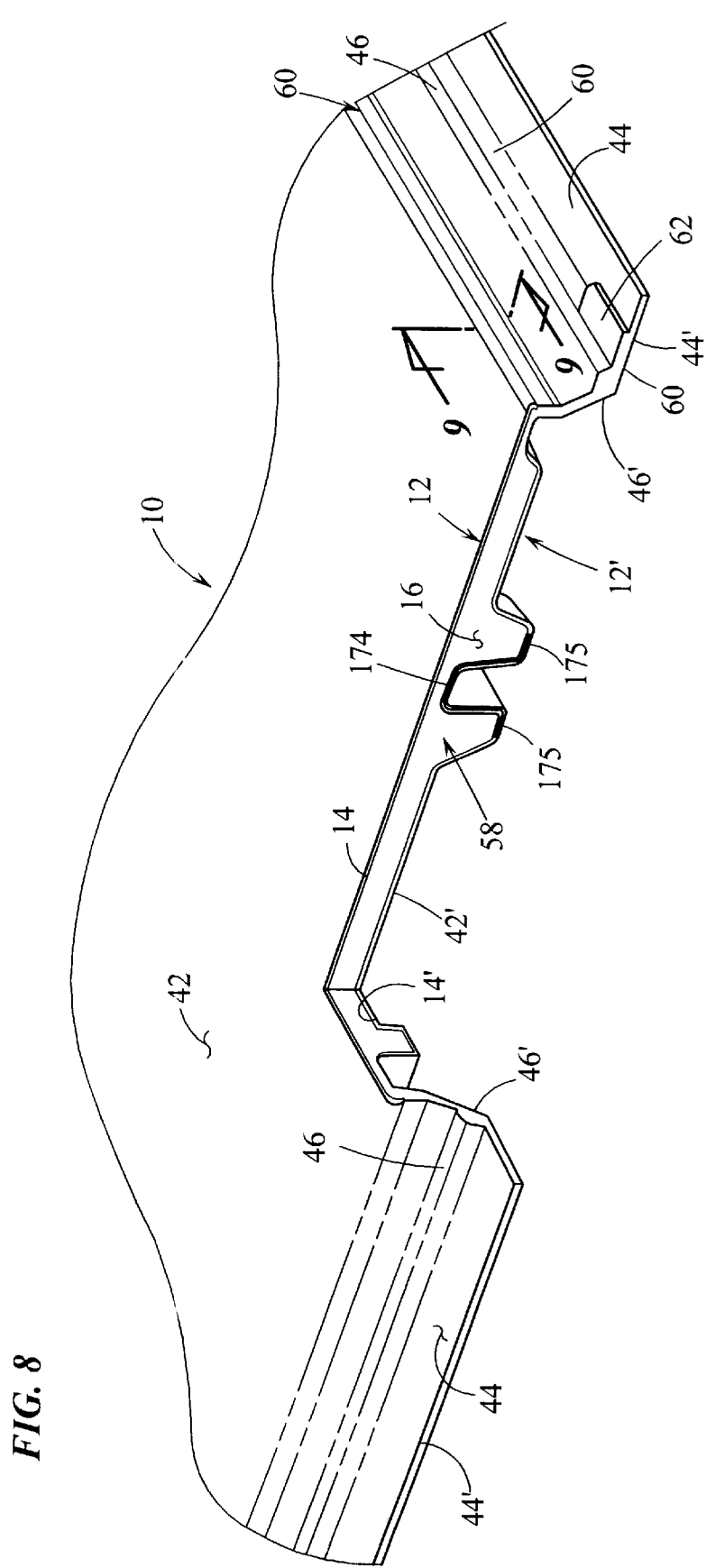
FIG. 8 is a partial, cross-sectional view of the tonneau taken along line 8—8 of FIG. 7.

As shown best in FIGS. 5, 6 and 8, the first outer polymeric sheet 12 defines a peripheral vacuum manifold 60 extending about the rim 44 along the outer edge of the curved transitional region 46. The first polymeric sheet 12 further defines a plurality of raised exhaust ports 62 spaced relative to each other along the manifold 60. As shown typically in FIG. 8, the manifold 60 is connected in fluid communication to the cavity 58 through the space formed between the curved transitional regions 46, 46'. As described further below, the exhaust manifolds 62 are pierced (not shown), and upon placing the outer polymeric sheets 12, 12' in a mold assembly, the manifolds are connected in fluid communication with a vacuum source to draw air out of the cavity 58, through the manifold 60 and exhaust ports 62 to, in turn, maintain an approximately predetermined vacuum within the cavity.

Figure 9:
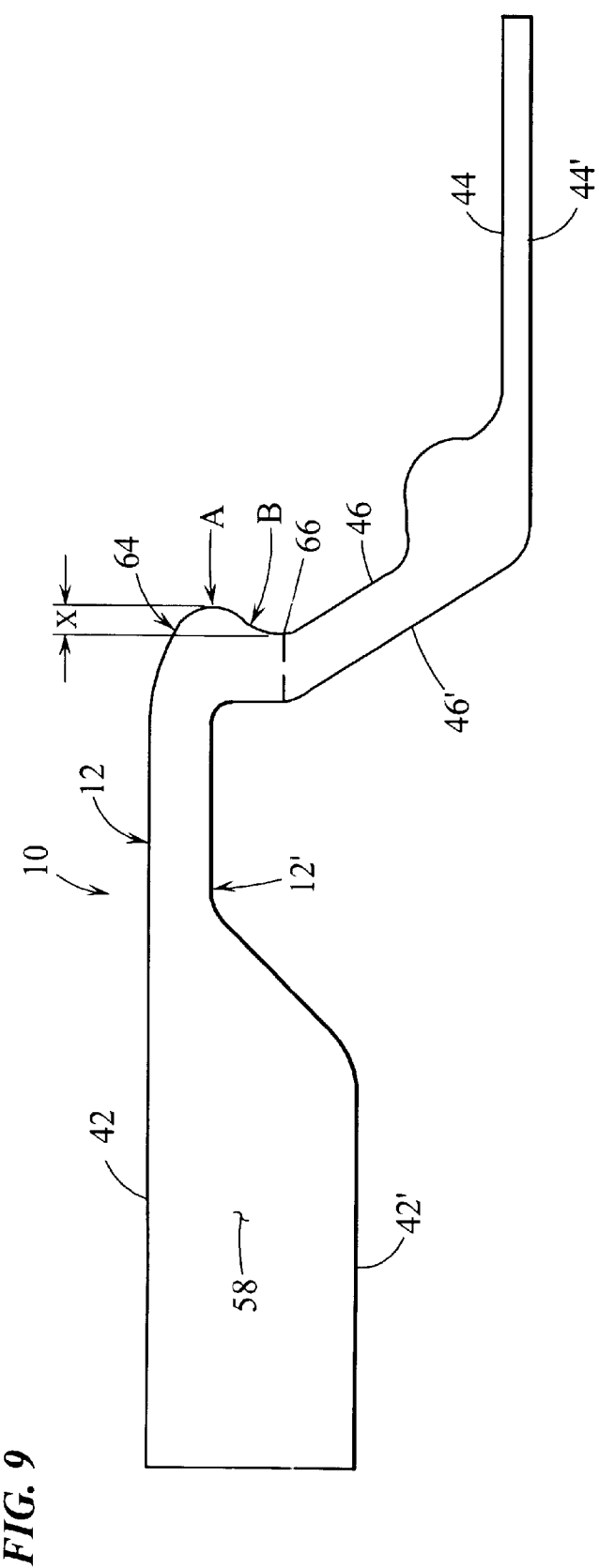
FIG. 9 is an enlarged, cross-sectional view taken along line 9—9 of FIG. 8 showing a cosmetic peripheral edge and negative return extending between the cosmetic peripheral edge and a cut edge spaced laterally inwardly and concealed from view on the finished part.
Figure 10:
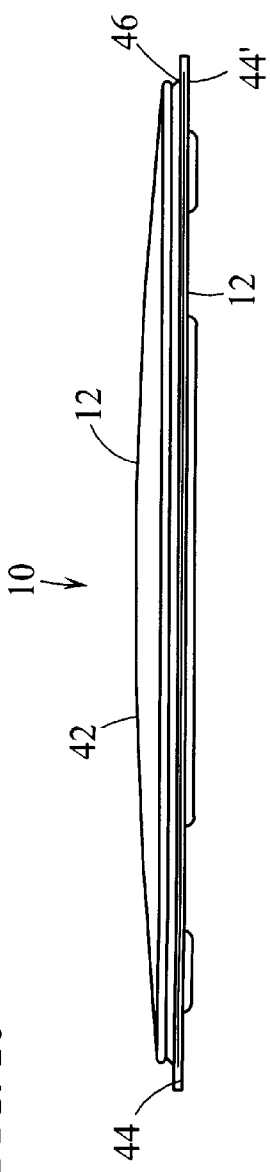
FIG. 10 is a side elevational view of the tonneau of FIG. 7.

As shown typically in FIG. 9, the tonneau 10 preferably includes a finished or cosmetic edge 64 extending about the periphery of the central panels 42, 42' and defining a negative return. After molding, and as described further below, the rim 44, 44' and curved transitional region 46, 46' are trimmed away to form the finished tonneau 10. As shown typically in broken lines in FIG. 9, the tonneau 10 defines a trim line 66 between the cosmetic edge 64 and curved transitional region 46 along which the composite structure is cut to form the finished tonneau. As shown typically in FIG. 9, the trim line 66 is spaced laterally inwardly a distance "X" from the outermost surface of the cosmetic edge 64. In the illustrated embodiment, and as shown typically in FIG. 9, the cosmetic edge 64 defines on its outermost portion an approximately convex profile "A", and defines on the portion extending between the outermost portion and the trim line 66 an approximately concave profile "B". However, as may be recognized by those of ordinary skill in the pertinent art based on the teachings herein, the cosmetic edge 64 may take any of numerous different shapes and/or configurations that may be dictated by various functional and/or aesthetic considerations.

Figure 11:
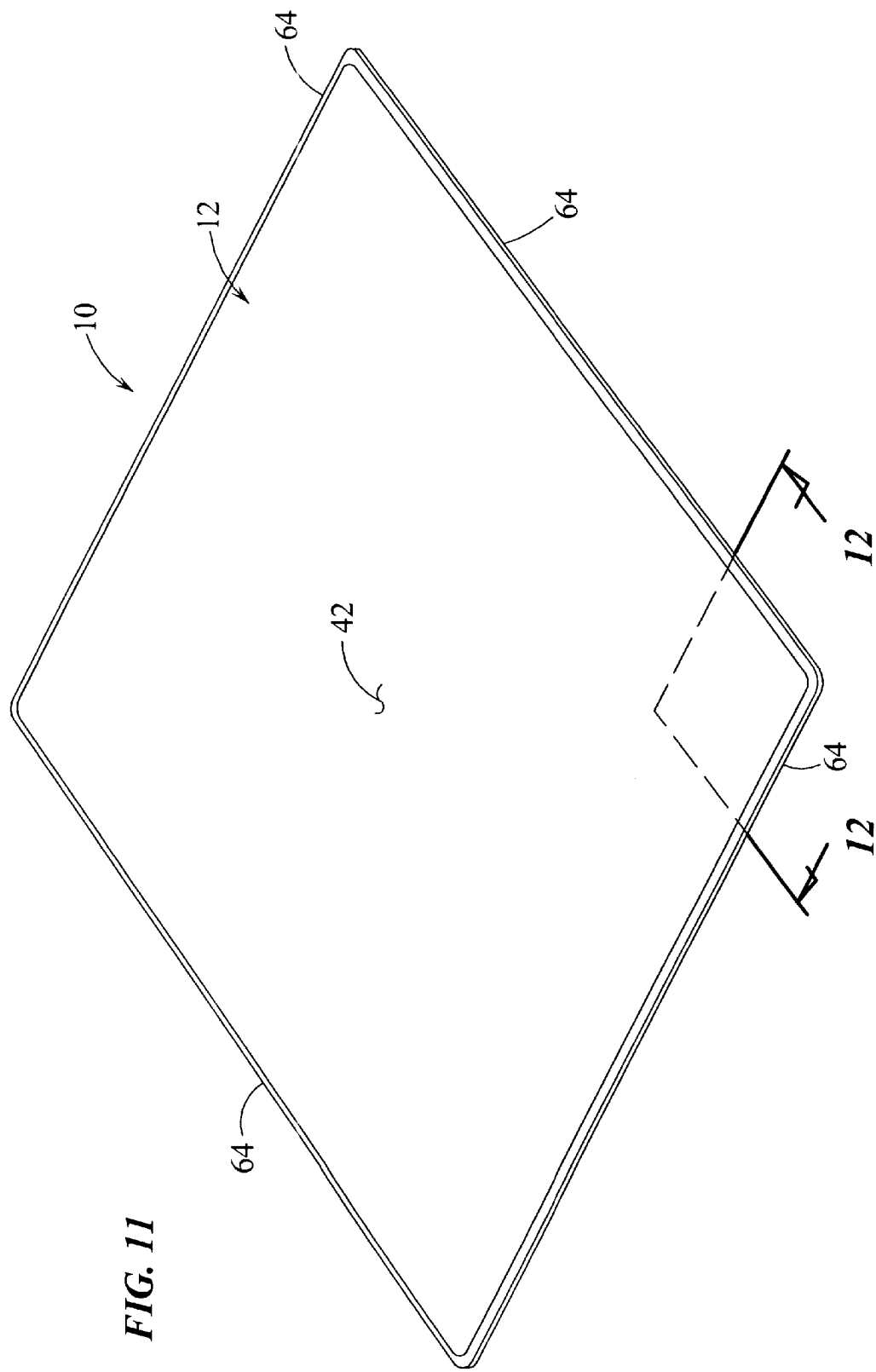
FIG. 11 is a top perspective view of the finished tonneau of FIG. 7 after trimming away the peripheral portions.
Figure 12:
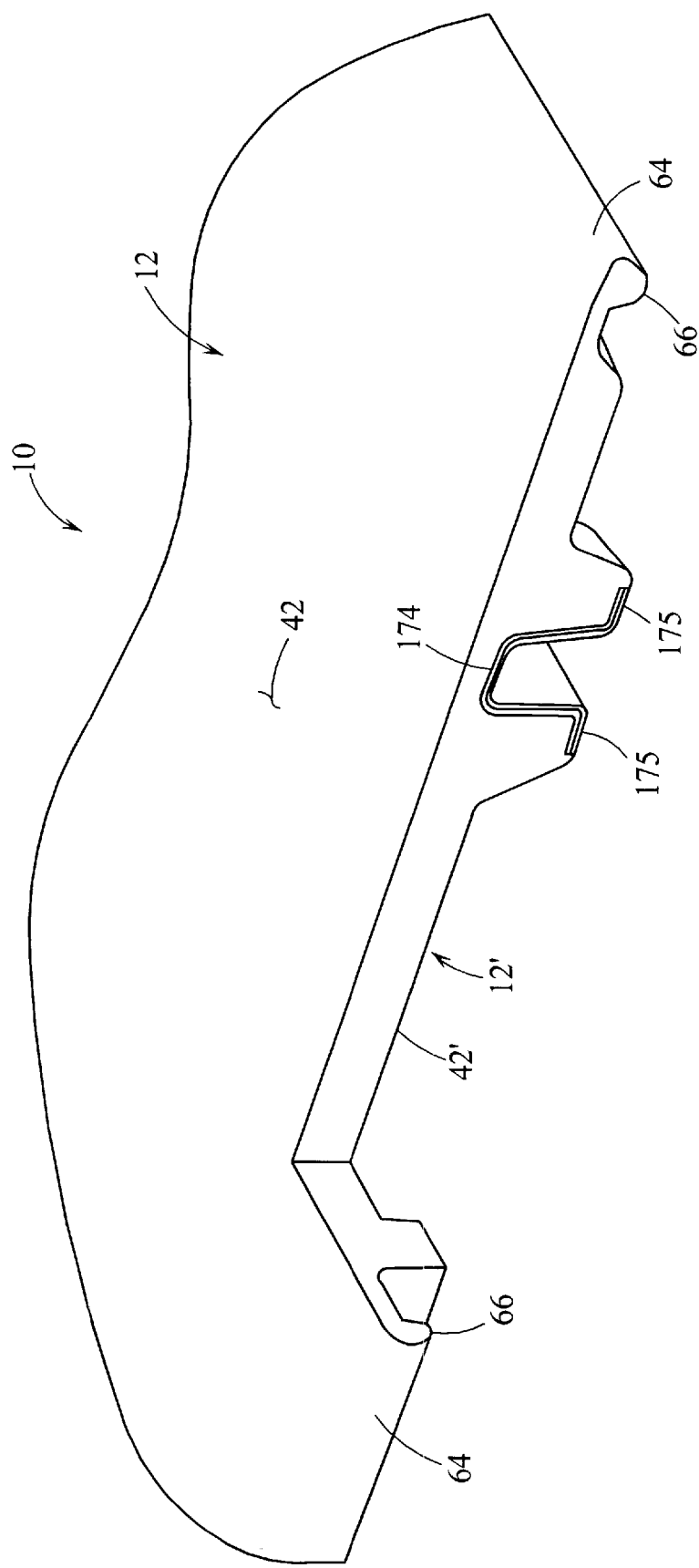
FIG. 12 is a partial, cross-sectional view taken along line 12—12 of FIG. 11.
Figure 13:
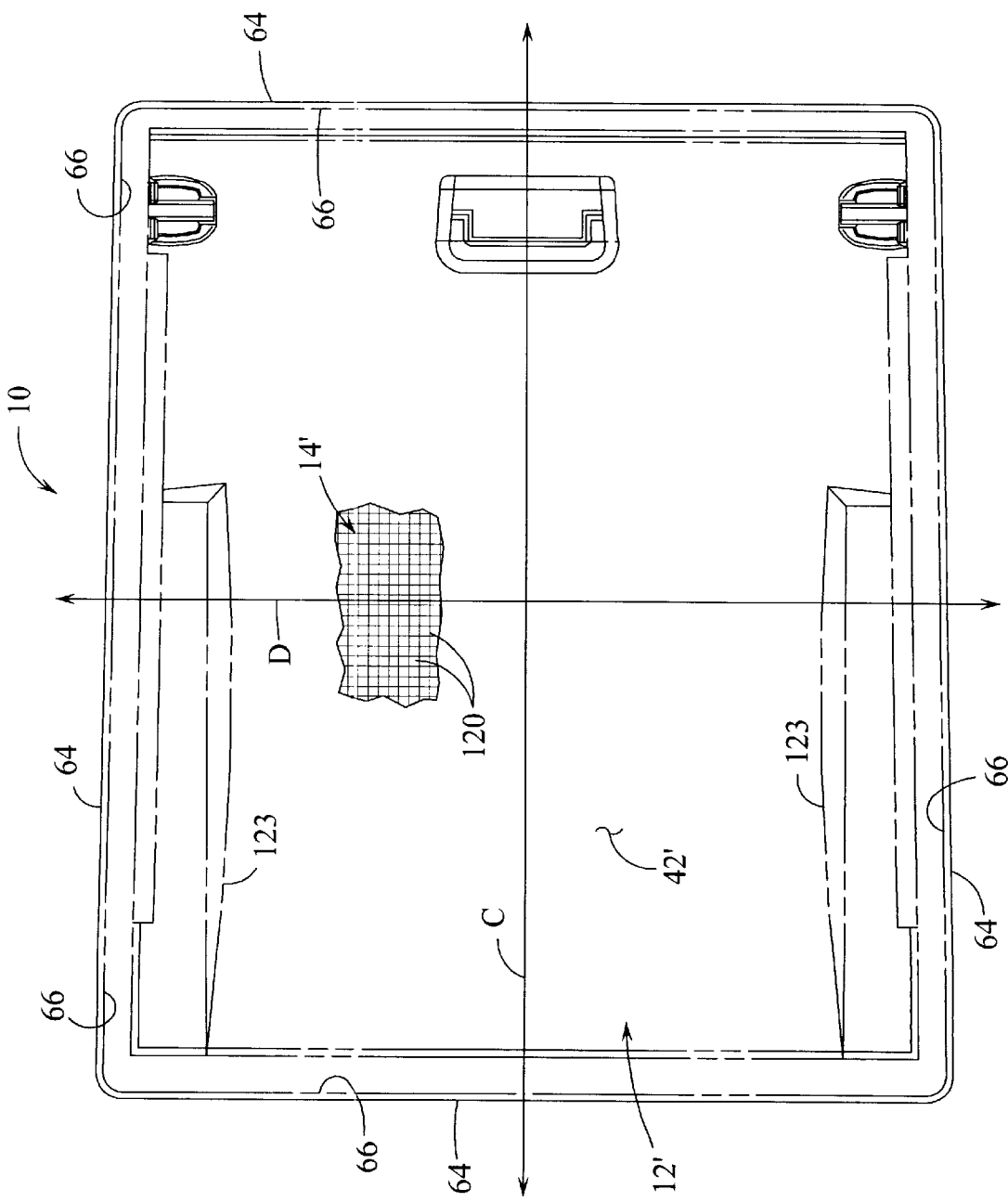
FIG. 13 is a partially cut-away, bottom plan view of the finished tonneau of FIG. 11.

As shown in FIGS. 11 through 13, after trimming away the rim 44, 44' and curved transitional region 46, 46', the cut surface defined by the trim line 66 is spaced laterally inwardly and underneath the cosmetic edge 64 of the finished part to thereby effectively conceal the cut edge and show only the smooth, cosmetic surface 64 along the outer peripheral portion of the finished part. In addition, when seated on a pick-up truck (not shown), the cut edge 66 contacts the upper or adjacent surface of the truck body to thereby further conceal the cut edge from view.

As may be recognized by those of ordinary skill in the pertinent art based on the teachings herein, the dimensions of the negative return are also dictated by the shrinkage characteristics of the polymeric sheets, and thus are related to the overall length, width and depth of the tonneau 10. For example, an exemplary rectangular polymeric sheet 12 formed of ABS having an overall length of approximately 75 inches, an overall width of approximately 75 inches, a thickness of approximately 0.0625 inch, and a shrinkage value of approximately 0.5%, defines a negative return of approximately 0.375 inch.

Although the cosmetic edge of the present invention is described herein with reference to a tonneau, as may be recognized by those of ordinary skill in the pertinent art based on the teachings herein, the cosmetic edge may be equally applied to any of numerous other composite structures. For example, the composite structures of the present invention may be used to form hard tops, doors, body panels, bumpers, or other parts or components of vehicles, and the cosmetic edge of the present invention may be equally suitable for use in such other parts and components to conceal the trim lines and otherwise expose only the uncut cosmetic edges to view.

Figure 14A:
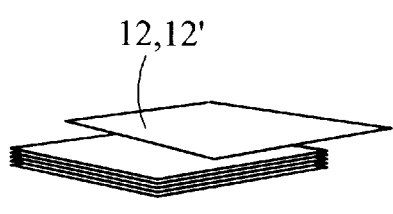
FIGS. 14A through FIG. 14D are somewhat schematic, perspective illustrations of the steps involved in thermoforming polymeric sheets for use in the composite structures of FIGS. 1 and 7.
Figure 14B:
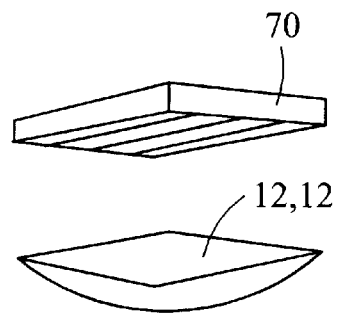
Figure 14C:
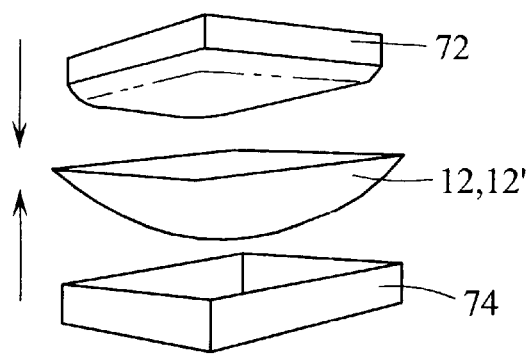

Turning to FIGS. 14A through 14D, in the embodiments of the present invention wherein the polymeric sheets 12, 12' are formed of thermoplastics, each sheet is initially cut, heated, and molded into inner and outer layers, or skins, of the finished part. First, as shown in FIG. 14A, the polymeric sheets 12, 12' are provided as flat sheets cut to predetermined dimensions. In order to form the tonneau as described above, the polymeric sheets each define a rectangular shape. Then, as shown in FIG. 14B, each sized polymeric sheet 12, 12' is clamped into a framework (not shown) and carried to a heat source 70 where it is heated beyond its heat deflection temperature to a near molten state. The temperature of each polymeric sheet 12, 12' is monitored by a series of thermocouples (not shown) that terminate the heating process when their ultimate set point is reached. Then, as shown in FIG. 14C, each polymeric sheet 12, 12' is transferred to a forming station that includes opposed thermo-forming surfaces 72 and 74.

One of the forming surfaces 72 or 74 can include a rigid tool face that represents the finished part, and the opposing forming surface 72 or 74 can include a partial tool, plug, or draw box. The opposed forming surfaces 72 and 74 move sequentially to first stretch each molten polymeric sheet 12, 12' in a uniform manner, then to drive the forming surfaces 72 and 74 together to produce a perimeter seal. The stretching process can be achieved by either drawing each polymeric sheet 12, 12' down into a box, or pulling each polymeric sheet 12, 12' over a male plug. In addition, a vacuum can be drawn through one or both of the forming surfaces 72 or 74 to pre-stretch each polymeric sheet 12, 12'.

Figure 14D:
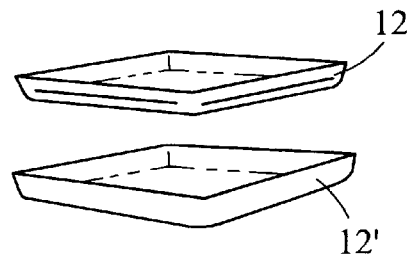

Once a seal between the forming surfaces 72 and 74 is achieved, the vacuum can be reversed and air pressure applied to the backside of the polymeric sheet 12, 12' to force the sheet into the details of the forming surfaces 72 and 74. Preferably, the forming surfaces 72 and 74 have a liquid such as water circulating through them. Initially, such a liquid can be heated to correspondingly heat the forming surfaces 72 and 74 to prevent the molten polymeric sheet 12, 12' from dragging on them as the three-dimensional shape is formed. As the molten polymeric sheet 12, 12' is forced into the details of the forming surfaces 72 and 74, the liquid cools the formed polymeric sheet and assists in de-molding the polymeric sheet, as indicated in FIG. 14D.

Formation of the Fibrous Layers

After providing the polymeric sheets 12, 12' in the desired shape, at least one fibrous layer 14, 14' is adhesively bonded to the inner surface of at least one of the polymeric sheets, and preferably both. In FIGS. 15A through 15D, a system and apparatus for adhesively bonding the fibrous layers 14, 14' to the polymeric sheets 12, 12' is indicated generally by the reference numeral 80. As shown in FIG. 15A, and described further below, the system 80 comprises stations 82, 84, 86, and 88 for sizing each fibrous layer 14, 14' and preparing it for adhesion to a respective polymeric sheet 12, 12'. A holding fixture 90 temporarily holds each fibrous layer 14, 14' and transfers it to each station 82, 84, 86, and 88 along a path 92. As shown typically in FIG. 15A, the holding fixture 90 may be provided in the form of a cart with wheels or other means for manually or automatically moving the holding fixture with fibrous layers from one station to the next.

As shown in FIG. 15B, a station 94 is provided for applying adhesive to each polymeric sheet 12, 12'. As described further below, a holding fixture 96 temporarily holds each adhesive-containing polymeric sheet 12, 12' and transfers it to the station 88 along a path 98 to receive a prepared fibrous layer 14, 14'. The holding fixture 96 may be the same as, or different than the holding fixture 90.

As shown in FIG. 15C, a station 100 includes a radiation-transparent, flexible enclosure 102 mounted on a roll 104. As described further below, the radiation-transparent enclosure 102 is provided to enclose each sub-assembly consisting of at least one fibrous layer 14, 14' applied to a respective polymeric sheet 12, 12'. A vacuum is applied to the radiation-transparent enclosure 102 to press the flexible enclosure against the fibrous layer 14, 14' and polymeric sheet 12, 12' and, in turn, press the fibrous layer against the adhesive-containing polymeric sheet. A holding fixture 106, which may the same as or different than the holding fixtures described above, temporarily holds the assembled polymeric sheet 12, 12' and the fibrous layer 14, 14' and transfers them to a station 108 along a path 110.

As shown in FIG. 15D, and described further below, the station 108 is provided for curing the adhesive and, in turn, bonding the fibrous layer 14, 14' to the polymeric sheet 12, 12'. In a preferred embodiment of the invention, a multi-purpose holding fixture is provided to perform any or all of the functions of the holding fixtures 90, 96 and 106 to thereby reduce the cost and complexity associated with providing several holding fixtures. Preferably, the multi-purpose holding fixture, or alternatively each of the holding fixtures 90, 96 and 106, further comprises a movable cart that is part of a conveyance system in a moving product line, or other means for manually or automatically moving the holding fixture from one station to the next. However, as may be recognized by those of ordinary skill in the pertinent art based on the teachings herein, the holding fixtures may take any of numerous different shapes and/or configurations that are currently, or later become known for manually or automatically holding and transporting the fibrous layers and polymeric sheets from one station to the next.

Application of Adhesive to the Polymeric Sheets

As shown in FIG. 15B, each polymeric sheet 12, 12' is placed into the holding fixture 96 to support and protect the exposed outer surface of the polymeric sheet. As described above, the holding fixture 96 preferably comprises a movable cart that is part of a conveyance system such that the holding fixture 96 can be moved along the path 98 into the spray booth or station 114. In the spray booth 114, adhesive is applied to the inner surface of one or both of the polymeric sheets 12, 12' in a discontinuous manner such that beads of the adhesive are disposed amongst relatively large areas of the inner surface that are free of adhesive.

Figure 16:
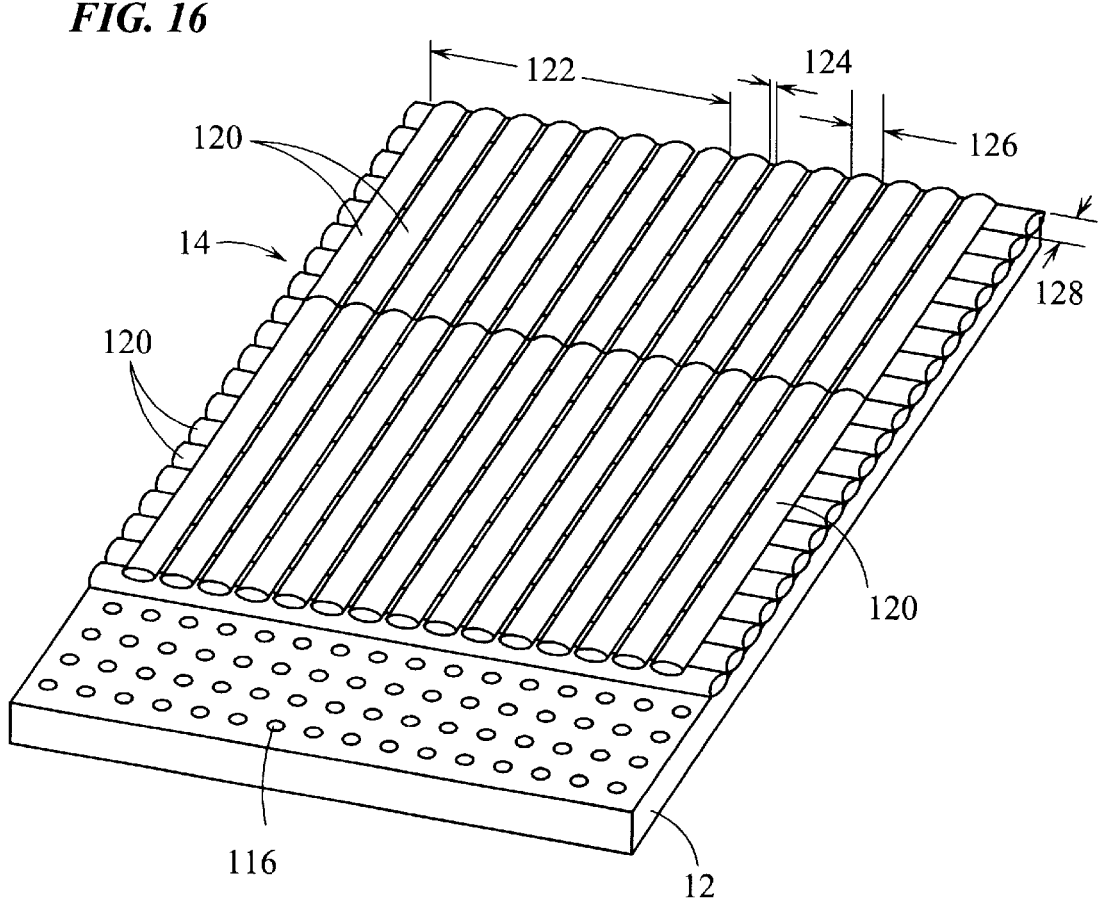
FIG. 16 is a partial cut-away, perspective view of a fibrous material applied to an adhesive-containing polymeric sheet in accordance with the present invention.

For example, as shown typically in FIG. 16, droplets 116 of the adhesive are preferably spattered over the surface of each polymeric sheet 12, 12' such that the adhesive is effectively applied to about 5% to about 30% of the surface area of the polymeric sheet, preferably to about 5% to about 15% of the surface area, and most preferably to about 5% to about 10% of the surface area. Application of the adhesive droplets 116 to each polymeric sheet 12, 12' can be monitored such that a preferred application in grams-of-adhesive per square-foot-of-coverage can be calculated. For example, to achieve about 5% to about 10% surface area coverage, a pressure-sensitive, UV-curable adhesive available from Loctite Co. under the product designation 3107 can be sprayed in droplets 116 onto the surface of each polymeric sheet 12, 12', at a rate of about 2.0 grams per square-foot-of-coverage, using a continuous one-pass spray pattern. The adhesive can be applied by an operator, or preferably by a conventional automated spray apparatus 118, as shown typically in FIG. 15B.

The application of adhesive must be sufficient to bond the fibrous material 14, 14' to the respective polymeric sheet 12, 12', and hold the fibrous material in place during injection of the polymeric core material 16. However, application of an excessive amount of adhesive will lower the available surface area of the polymeric sheet 12, 12' for adhesively bonding with the polymeric core material 16. In addition, the viscosity of the adhesive should be sufficient such that beads of the adhesive will attach to any vertical surfaces of the polymeric sheet 12, 12' and maintain a bead-like consistency. Preferably, the adhesive beads define a predetermined level of surface tension that allows the beads to engage and wick into the fibrous layers 14, 14'. The adhesive employed in the currently preferred embodiment of the present invention provides a bond quality similar to that of the resinous urethane elastomer employed as the core material 16 and described more fully below. Accordingly, the adhesive should not form a contaminant to any such system. The illustrative adhesive described above exhibits the desired viscosity, bead surface tension, and bond quality described herein.

In various embodiments of the invention, the adhesive may be a pressure-sensitive adhesive, and/or a radiation activatable adhesive, such as a light activated or UV activated adhesive. For example, an adhesive containing a light-activated curing agent can be formulated with an acrylated urethane including a photo-initiator such that the adhesive can be cured upon exposure to a light source. Use of an acrylated urethane is preferred because exposure to relatively high temperatures during the molding process requires the use of a relatively high-performance adhesive in comparison to a more conventional pressure-sensitive adhesive. In a preferred embodiment of the invention, the photo-initiator comprises an ultraviolet initiator such as Darocur 1173 from Ciba Specialty Chemicals. Use of such an adhesive substantially reduces cure cycle times and correspondingly reduces overall manufacturing cycle times. However, as may be recognized by those of ordinary skill in the pertinent art based on the teachings herein, any of numerous other adhesives that are currently or later become known for performing the functions of the adhesive described herein may be equally employed, such as hot melts, 2-component acrylics, epoxy, polyester, latex urethanes and urethanes. Such adhesives are commercially available from various companies, including Jet-Weld, 3M Adhesives, and ITW Adhesives.

The Fibrous Material

Following formation of the polymeric sheets 12, 12' and application of adhesive to the sheets, one or more reinforcing layers of fibrous material 14, 14' are applied to the adhesive-containing sheets. The type of fibrous material 14, 14', and/or location, orientation, and number of layers of each such material, are selected to impart to the composite structure 10 impact resistance, modulus stiffness, tensile strength, compressive strength, and/or an advantageous coefficient of thermal expansion. Each layer of fibrous material 14, 14' may consist of any of numerous different fibrous structures that are currently, or later become known for performing the functions of the fibrous layers described herein, including random mat fibers, unidirectional fibers, bi-directional fibers, other multi-directional fibers, and/or multiple layer fabrics with reinforcement plies in at least two directions.

The selection of a unidirectional, bi-directional, other multi-directional fibers, and/or random mat fiber, can be made to impart a variety of desired physical characteristics to the composite structure 10. For example, a unidirectional or bi-directional fiber predictably enhances the strength of the composite structure in the directions of the fibers. A directional fiber also can provide increased stiffness in comparison to a random mat fiber. Alternatively, a random mat fiber typically provides greater resistance to deformation and crack propagation than does a directional fiber. Additionally, better adhesion typically can be achieved between a random mat fibrous material and a polymeric sheet, than between a directional fibrous material and a polymeric sheet.

In one preferred embodiment of the present invention, one or both fibrous layers 14, 14' includes at least one directional fiber mat, and at least one random fiber mat located between the directional fiber mat and the respective outer polymeric layer 12, 12'. The directional fiber mat is preferably of the type described further below, and includes a plurality of approximately parallel fibrous tow bundles. The random fiber mat, on the other hand, may be formed from a hybrid fibrous material, such as the quasi-isotropic material sold under the designation UN-750 by Vetrotex Centainteed Corp., or like material sold by Brunswick Technologies, Inc.

One advantage of this embodiment of the present invention is that the directional fiber layer imparts enhanced strength and stiffness in the direction of the fibers, whereas the random fiber layer imparts improved adhesion to the respective outer polymeric layer, increased impact resistance, improved surface finish with minimal or no print-through that might otherwise result from directional fibers located immediately adjacent to the outer polymeric layers, and/or stress dissipation and reduced crack propagation. If desired, the random fiber mat may be selectively applied only to those areas where its characteristics are desired. For example, the random fiber mat may be applied only at selected points where necessary to enhance impact resistance, or only adjacent to select cosmetic surfaces where necessary to achieve better-quality exterior surfaces finish. The directional fibers likewise may be applied only where necessary to achieve increased strength and/or stiffness, or to impart predetermined torsional characteristics to the composite structure. Similarly, the directional fibers may be selectively applied to reduce the coefficient of thermal expansion of the composite structure 10 in the directions of the fibers. This feature is particularly advantage when designing automotive parts. For example, when manufacturing automotive body panels, or large automotive components, such as bumpers, it may be necessary to selectively reduce the coefficient of thermal expansion of the composite structure in one or more directions to, in turn, avoid noticeable spaces or gaps between adjacent body parts or other components. In order to achieve this result, the directional fibers are aligned with the direction(s) in which the relatively reduced coefficient of thermal expansion is desired.

In the tonneau 10 described above, the fibrous layers are aligned in a manner to relatively reduce differential thermal expansion in selected directions, and to control the torsional characteristics of the structure. As shown typically in FIG. 13, each fibrous layer 14, 14' comprises bidirectional fibrous tow bundles 120. As can be seen, a first group of the fibrous two bundles 120 are aligned, or extend parallel to the elongated axis "C" of the tonneau, and a second group of the fibrous two bundles 120 are aligned, or extend parallel to the elongated axis "D" of the tonneau. Accordingly, the orientation of the tow bundles significantly reduces any differential thermal expansion of the tonneau in the directions of the axes C and D. As can be seen in FIG. 13, the largest dimensions of the tonneau 10 extend along, or are parallel to the axes C and D, and therefore the differential thermal expansion is preferably reduced in these directions to thereby reduce the overall differential thermal expansion of the tonneau. In addition, the directional fibers significantly increase the stiffness of the tonneau in the directions of the axes C and D, and furthermore, control the torsional characteristics such that the tonneau will flex or bend in directions diagonal to the major axes C and D. Controlling the torsional characteristics in this manner is particularly critical in designing automotive components, such as tonneaus, which must be allowed to flex or bend, but only in certain predetermined directions. As also shown in FIG. 13, the tonneau 10 includes a pair of elongated ribs 123 laterally spaced relative to each other and extending parallel to the axis C in order to further enhance the stiffness of the tonneau 10.

In accordance with the present invention, each layer of the fibrous material 14, 14' must exhibit sufficient permeability to permit an adequate flow of polymeric core material 16 through the fibrous material as described further below. Several characteristics of the fibrous material can affect its permeability, and therefore can affect this desired result. Such characteristics include, for example, fiber yield, fiber density, and fiber volume. With reference to FIG. 16, additional features affecting permeability include the number of ends of the fiber tow bundles 120 per inch (the "ends-per-inch 122"), the width of the gap 124 between each of the fiber tow bundles 120, the width 126 of each fiber tow bundle, and the thickness 128 of each fiber tow bundle. Lastly, the fiber bundle stitch pattern also affects permeability.

As is well known, the fiber yield is indicative of the number of feet of a particular fibrous bundle that is required to form one pound. The fiber yield, therefore, relates to the diameter of the bundle, such that the lower the yield, the larger is the diameter. Accordingly, the fiber yield of each fibrous layer 14, 14' is selected to impart sufficient strength to the composite structure, and to ensure sufficient wicking (or "wetting out") of the polymeric core material 16 in a resinous state through the fibrous layer. In the preferred embodiment of the present invention, the fiber yield is within the range of approximately 330 to approximately 600, and most preferably is approximately 450.

In addition, the number of ends-per-inch 122 of the fiber bundles and the corresponding gap 124 between the fiber bundles is indicative of the density, or weight-per-square yard of the fibrous material. For example, a fibrous material exhibiting a bundle width 126 of 0.125 inch, and eight ends-per-inch 122, would exhibit essentially no gap 124 between the fiber bundles 120. On the other hand, a fibrous material exhibiting a bundle width 126 of 0.0625 inch, and eight ends-per-inch 122, would exhibit a gap 124 between the fiber bundles of approximately 0.0625 inch. A fibrous material 14 exhibiting no gap, or too narrow a gap between the bundles, will impede the flow of polymeric core material 16 in a resinous state therethrough. In contrast, a fibrous material 14 exhibiting too wide a gap will permit too rapid a flow of polymeric core material 16 through the fibrous material and may allow the resinous core material to transition to a foam state within the fibrous material.

In a preferred embodiment of the present invention, the desired permeability of the fibrous material 14 is achieved by selecting a fibrous material exhibiting an ends-per-inch

122 preferably within the range of about 5 through about 15, and most preferably about 7; a gap 124 between fiber bundles within the range of about 0.005 inch through about 0.02 inch, and most preferably about 0.01 inch; a width 126 between fiber bundles within the range of about 0.05 inch through about 0.25 inch, and most preferably about 0.15 inch; and a bundle thickness 128 within the range of about 0.005 inch through about 0.025 inch, and most preferably about 0.016 inch.

As indicated above, the stitch pattern of the fibrous material 14 also affects its permeability. If the stitch pattern is such that the bundles are pulled too tightly together, the polymeric core material 16, in its resinous state, will flow around each bundle rather than advantageously flow through and into the interstices of each bundle to thereby wet the individual fibers. In contrast, if the stitch pattern is such that the bundles are too loose, the desired strength characteristics may be diminished. Preferably, the stitch pattern permits lateral movement of each tow bundle 126 up to a distance equal to approximately twice the width 126 of each bundle. In the currently preferred embodiment of the present invention, the stitch pattern employed is the tricot stitch pattern. However, as may be recognized by those of ordinary skill in the pertinent art based on the teachings herein, any of numerous different stitch patterns that are currently, or later become known equally may be employed for performing the functions of the stitch pattern described herein.

Fibrous Material Preparation And Application to the Adhesive-Containing Polymeric Sheets Turning again to FIG. 15A, after selecting the fibrous material 14, 14', an automated apparatus and system is provided to size each fibrous layer 14 and prepare it for adhesion to the respective polymeric sheet 12, 12'. In the illustrated embodiment of the present invention, the fibrous material 14, 14' is cut from a roll 130 and draped over a tool surface 132 preferably defining a vacuum chuck that has been preferentially drilled or otherwise provided with a plurality of vacuum holes connected in fluid communication with a vacuum source (not shown). The number, frequency, and positioning of the holes are determined by the complexity of the shape of the molded polymeric sheet 12, 12' in order to ensure that the vacuum causes the fibrous layer 14, 14' to conform to the surface contours of the chuck and hold the fibrous layer in place. The vacuum chuck 132 further defines a peripheral shape corresponding to that of the formed polymeric sheet 12, 12'. A conforming tool 134 defines a surface contour or morphology corresponding to that of the vacuum chuck 132, and as indicated by the arrows in FIG. 15A, is movable into and out of engagement with the vacuum chuck to assist in pressing the fibrous material 14, 14' into conforming contact with the surfaces of the vacuum chuck. The vacuum source is actuated to draw a vacuum through the chuck and, in turn, further pull the fibrous layer 14, 14' into engagement with the chuck and hold the fibrous layer thereto. The vacuum chuck 132 is movable in the holding fixture 90 along the path 92 into the cutting station 86. As further shown in FIG. 15A, the cutting station 86 comprises a multi-axis cutting tool 134 movably mounted on a frame 135 overlying the holding fixture 90 to automatically cut the fibrous layers. The multi-axis cutting tool 134 is of a type known to those of ordinary skill in the pertinent art, and preferably moves in five axes and is controllable by a computer or like controller (not shown) to automatically trim any excess fibrous material from around the periphery of the fibrous layers 14, 14' and, if necessary, trim away any internal portions of the fibrous layers, to form a near-net shape.

As further shown in FIG. 15A, after trimming the fibrous layer 14, 14' in the cutting station 86, the holding fixture 90 and vacuum chuck 132 are moved along the path 92 from the cutting station to the transfer station 88. The transfer station 88 includes a manipulator 136 rotatably mounted on a carriage 137, and the carriage 137 is laterally driven on a frame 139. The manipulator 136 is movable vertically into engagement with the vacuum chuck 132 seated on the holding fixture 90. Accordingly, upon entering the transfer station 88, the manipulator 136 is lowered into engagement with the vacuum chuck 132 to engage and lift the chuck and fibrous layer 14, 14' attached thereto off of the holding fixture 90.

Upon lifting the vacuum chuck 132, the manipulator 136 rotatably inverts the chuck so that the fibrous layer is facing downwardly, and the carriage 137 is then moved laterally on the frame 139 until the chuck 132 and fibrous layer 14, 14' are superimposed over the adhesive-containing polymeric sheet 12, 12' carried on the holding fixture 96. The manipulator 136 also is connected to a vacuum source (not shown) to, in turn, connect the vacuum chuck 132 when mounted on the manipulator in fluid communication with the vacuum source and hold by vacuum the fibrous layer 14, 14' to the chuck during manipulation. The chuck 132 and fibrous layer 14, 14' are then moved downwardly by the manipulator 136 over the adhesive-containing polymeric sheet 12, 12' and pressed into engagement with the adhesive-containing polymeric sheet such that the periphery of the vacuum chuck forms a perimeter seal around the polymeric sheet. The vacuum is then drawn through the chuck 132 to thereby draw the adhesive-containing polymeric sheet 12, 12' into engagement with the fibrous layer 14, 14'. Preferably, the pressure sensitive or tacky nature of the adhesive is sufficient to hold the fibrous layer 14, 14' to the polymeric sheet 12, 12' for further processing. Then, once the fibrous and polymeric layers are mated, the vacuum in the chuck 132 is reversed to thereby release the polymeric sheet and fibrous layer bonded thereto from the vacuum chuck onto the holding fixture 96 for further processing.

One advantage of this automated system of the present invention is that the bonding process can be performed sequentially, rather than discontinuously, as is typically associated with batch-type processing. An automated process for bonding fibrous material to a polymeric layer promotes production line processing and thereby permits relatively high volume production in comparison to the batch-type processing employed in the prior art to bond fibrous material to polymeric layers. Similarly, the automated process of the invention significantly reduces the cycle time involved in pre-shaping the fibrous material, consolidating the fibrous material tightly against a shaping tool, trimming the fibrous material to a near-net shape, and adhesively bonding the fibrous material to the polymeric sheets.

Another advantage of the process and system of the invention is the discontinuous manner of applying the adhesive to tack the fibrous material 14, 14' to the adhesive-containing polymeric sheets 12, 12' to, in turn, carry out the processing steps that follow. As described above, the adhesive can be applied to the polymeric sheets 12, 12' in a sufficiently dispersed manner to permit substantial areas of the surfaces of the polymeric sheets to remain without any adhesive. This method permits the polymeric core material 16, when injected into the cavity between the polymeric sheets 12, 12' as is described further below, to penetrate and fully wet out the fibrous material 14, 14', and in turn permanently adhere the fibrous material to the adhesive-containing polymeric sheets. Accordingly, if the adhesive attaches the fibrous material 14, 14' to the polymeric sheets 12, 12' at only discrete points of contact, it will not interfere with the function of the polymeric core material 16 in permanently adhering the fibrous material to the polymeric sheets. Alternatively, the fibrous material 14, 14' can be bonded to the adhesive-containing polymeric sheets 12, 12' in discrete locations to provide local fibrous reinforcement, and predetermined areas without fibrous reinforcement, depending upon the desired physical characteristics and/or applications of the composite structure 10.

As shown in FIG. 15D, the assembled polymeric sheet 12, 12' and fibrous layer 14, 14' are then transferred by the holding fixture 106 along a path 110 into a curing station 108 to cure the adhesive and thereby further secure the fibrous layer to the polymeric sheet for further processing. In the embodiments of the present invention employing a radiation-curable adhesive, the curing station 108 includes a housing 138 and a radiation source 140 mounted within the housing for transmitting sufficient radiation to cure the adhesive and thereby bond the fibrous material 14, 14' to the polymeric sheet 12, 12'. The fibrous material 14, 14' is bonded to the adhesive-containing polymeric sheet 12, 12' in a manner whereby the fibrous material is held tightly to the inner surface of the adhesive-containing polymeric sheet; however, as described above, the adhesive preferably does not wet out or saturate the fibrous material. In the currently preferred embodiment of the present invention, the adhesive is UV-activated, and therefore the radiation source 140 transmits UV radiation. In addition, the housing 138 encloses the radiation source 140 and cart 106 received therein to contain the radiation in a manner known to those of ordinary skill in the pertinent art to thereby protect the operators from unnecessary radiation exposure.

Turning to FIG. 15C, and in accordance with a preferred embodiment of the present invention, a radiation-transparent enclosure 102 is used to enclose the polymeric sheets and fibrous layers attached thereto and press the fibrous layers and polymeric sheets toward each other during the adhesive cure. In the illustrated embodiment, the transparent enclosure 102 comprises a sealed, flexible enclosure that encloses or surrounds a respective assembled polymeric sheet and fibrous layer. As shown in FIG. 15C, the flexible enclosure 102 is provided on a roll 104 so that it can be unrolled over the assembled polymeric sheet and fibrous layer. In the roll form, the enclosure 102 may consist of a flexible, transparent sheet, or alternatively, may consist of a plurality of transparent bags connected together by perforated portions to allow each successive bag to be removed from the roll along a respective perforated line. In the embodiment employing a transparent sheet 102 (as opposed to a transparent bag), a sealing member 141 is mounted above the holding fixture 106 and is movable toward and away from the holding fixture to engage the perimeter of the transparent sheet 102 and form a perimeter seal between the sheet and fixture. The holding fixture 106 is connected in fluid communication with a vacuum source (not shown) for evacuating the space between the enclosure and the polymeric sheet and fibrous layer attached thereto. This, in turn, applies atmospheric pressure against the polymeric sheet and fibrous layer to press these layers together and facilitate formation of the adhesive bond. Depending upon the selected adhesive, the radiation source 140 transmits an appropriate type of radiation, such as UV or visible light, through the transparent enclosure 102 to cure the adhesive and thereby secure the fibrous material 14, 14' to the polymeric sheet 12, 12'. As may be recognized by those of ordinary skill in the pertinent art based on the teachings herein, the transparent enclosure 102 can be made of any of numerous different materials, and may take any of numerous different forms or shapes that are currently or later become known for performing the functions of the radiation-transparent enclosure described herein.

The Composite Structure Molding Apparatus

Figure 17A:
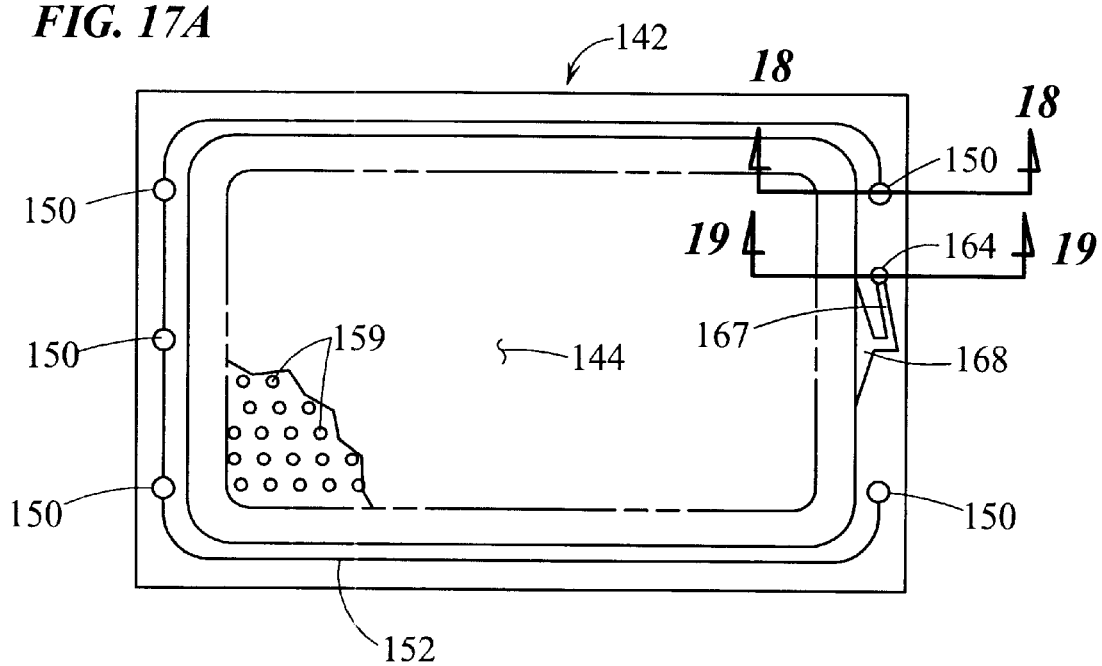
FIG. 17A is a plan view of an upper mold half or platen embodying the present invention for forming the composite structures.
Figure 17B:
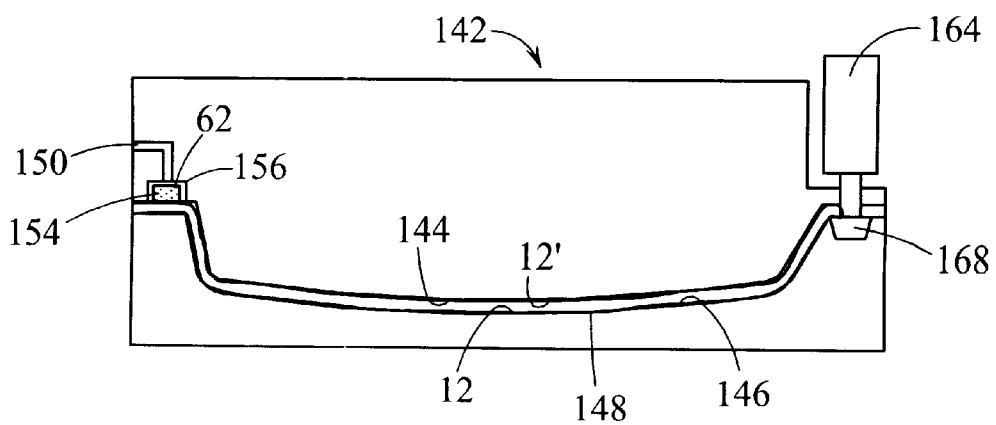
FIG. 17B is a somewhat schematic, cross-sectional view of the mold assembly of the present invention for forming composite structures.

As shown in FIG. 17B, a mold assembly 142 of the present invention includes a first mold half defining a first mold surface or platen 144, and a second mold half defining a second mold surface or platen 146. As shown, when the mold halves are moved into the closed or molding position, the first and second opposing mold surfaces 144 and 146, respectively, are spaced relative to each other to define a mold cavity 148 therebetween. As further shown in FIG. 17B, the first polymeric sheet 12 and layer of fibrous material 14 adhesively attached thereto are placed into the first mold surface 144, and the second polymeric sheet 12' and fibrous layer 14' adhesively attached thereto are placed into the second opposed molding surface 146.

In a preferred embodiment of the invention and as shown in FIG. 17A, one of the molding surfaces 144 or 146 of the mold assembly 142 is preferentially drilled or otherwise provided with a plurality of first vacuum ports 150. The number, frequency, and positioning of the first vacuum ports 150 are determined by the complexity of the shape of the composite structure 10 to be formed. As shown in FIG. 17A, the first vacuum ports 150 are connected in fluid communication with one another and with the mold cavity 148 through a perimeter vent galley 152. As shown typically in FIG. 18, each first vacuum port 150 is connected in fluid communication with a common vacuum manifold 162, and the vacuum manifold is in turn connected in fluid communication with a vacuum source (not shown) for drawing a vacuum within the cavity 148, as is described further below.

As shown in FIG. 17B, the first mold half defines a plurality of reservoirs 156 formed at the inlet of each first vacuum port 150 for receiving the raised exhaust ports 62 formed in the peripheral rim 44 of the first polymeric sheet 12. Prior to inserting the first polymeric sheet 12 into the mold, and as shown typically in FIG. 18, a porous media 154 is inserted into each raised exhaust port 62 to permit the venting of air or other gases through the exhaust ports and otherwise prevent any polymeric core material from passing therethrough. Preferably, the porous media 154 received in each raised exhaust port 62 is provided as a preform that corresponds in shape to the interior surfaces of the raised exhaust port and can be slidably received and retained within each port. The porous media 154 may take the form of any of numerous different types of such media that are currently, or later become known for performing the functions of the porous media described herein, such as CSM or other porous paper and/or polymeric filter material. As shown typically in FIG. 18, an aperture 157 is formed through the upper surface of each raised exhaust port 62 to thereby connect the exhaust port in fluid communication with the respective first vacuum port 150 and draw the vacuum through the port.

As shown typically in FIG. 17A, the first and second mold surfaces 144 and 146, respectively, each define a plurality of second vacuum ports 159 formed therethrough and connected to a vacuum source (not shown). Although not shown for the sake of clarity, the second vacuum ports 159 are distributed throughout each mold surface 144 and 146 to draw a vacuum through each mold surface and thereby secure the polymeric sheets 12 and 12' to the respective mold surfaces during the molding process. As described in further detail below, a vacuum is drawn through the first vacuum ports 150 at a first predetermined vacuum level to maintain a vacuum within the cavity 148 (and thus within the cavity formed between the opposing polymeric sheets 12, 12'), and a vacuum is drawn through the second vacuum ports 159 at a second predetermined vacuum level for holding the outer polymeric sheets 12, 12' to the mold surfaces. In accordance with the present invention, the first vacuum level is less than the second vacuum level in order to ensure that the polymeric sheets 12, 12' are not pulled away from the mold surfaces, but rather are securely engaged by vacuum to the mold surfaces throughout the molding process.

Figure 18:
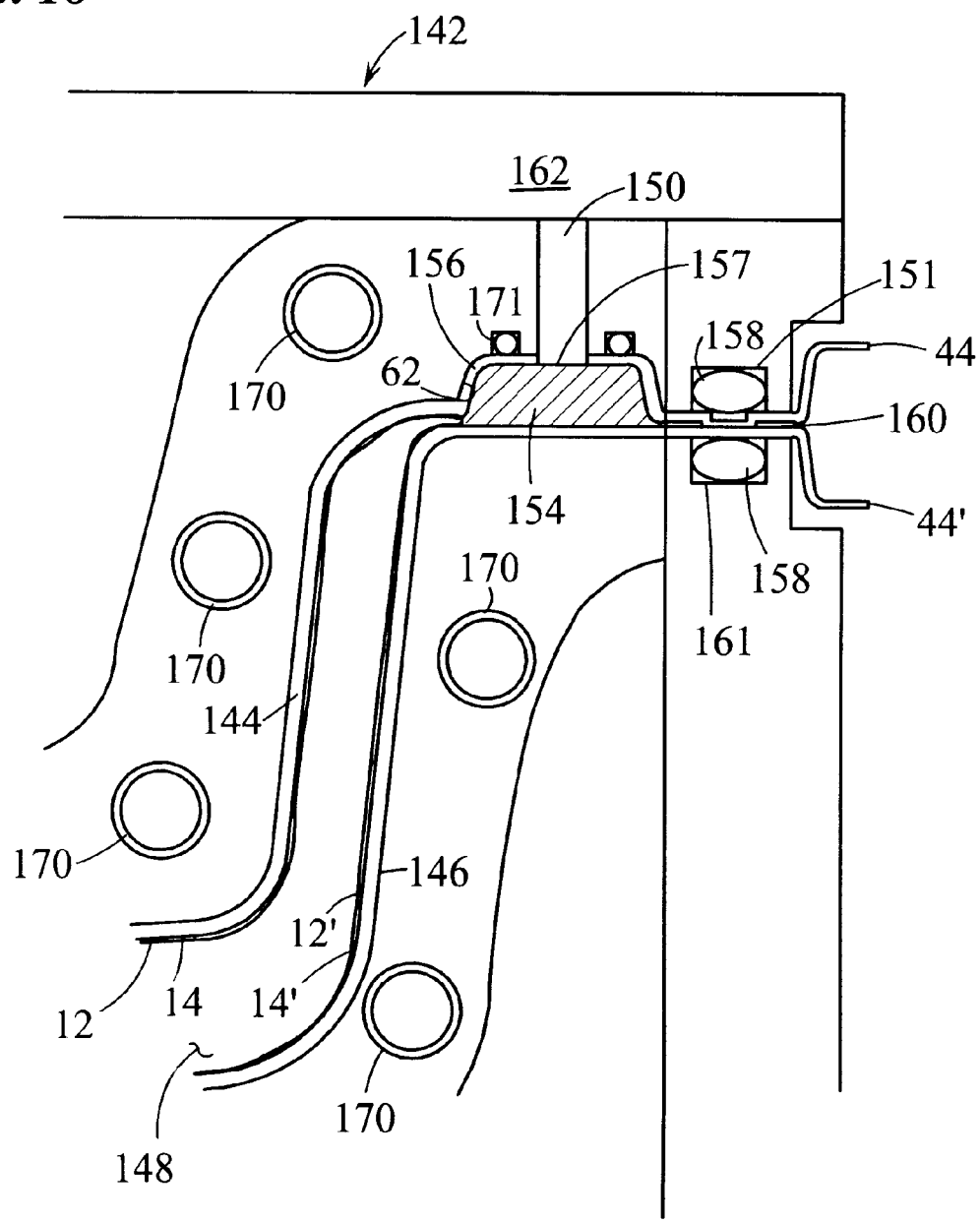
FIG. 18 is a partial, cross-sectional view taken along line 18—18 of FIG. 17B and illustrating a typical composite structure formed within the mold assembly in accordance with the present invention.
Figure 19:
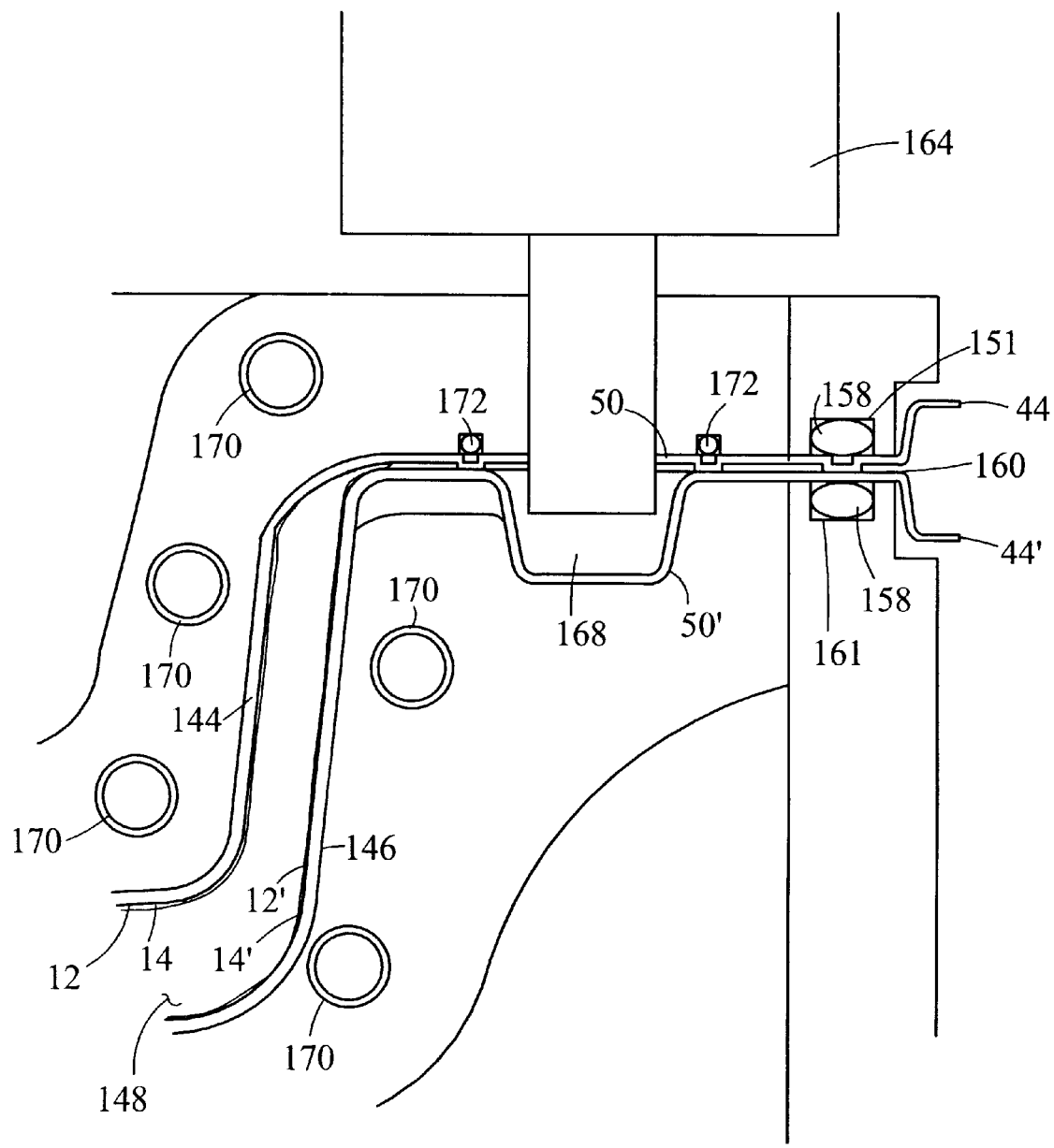
FIG. 19 is a partial, cross-sectional view taken along line 19—19 of FIG. 17B and illustrating a typical composite structure formed within the mold assembly.

As shown best in FIGS. 18 and 19, each mold half defines a perimeter groove 161 extending about the perimeter of the respective mold surface for receiving an o-ring or like sealing member 158 and forming a hermetic seal between the mold halves and the polymeric sheets 12 and 12' received between the mold halves. During the molding process, adequate tonnage is applied to the mold 144 to press the mold halves together and thereby form the perimeter seal and to prevent the mold from gapping or otherwise distorting.

As also shown typically in FIGS. 18 and 19, one of the polymeric sheets 12 or 12' defines a rib 160 formed in the peripheral rim 44 or 44' of the respective polymeric sheet and extending about the periphery of the sheet. When the polymeric sheets 12 and 12' are placed in the mold 144, the rib 160 contacts the opposing surface of the other polymeric sheet, and the peripheral regions 44, 44' of the polymeric sheets are pressed toward each other by the application of tonnage to the mold. Under the pressure (or tonnage) applied by the mold, the rib 160 is distorted to thereby form a hermetic seal between the polymeric sheets 12 and 12' extending about the periphery of the sheets that, in turn, facilitates maintaining a predetermined vacuum level within the mold cavity throughout the molding process. As may be recognized by those skilled in the pertinent art based on the teachings herein, the opposing sealing surfaces of the polymeric sheets 12, 12' may define any of numerous different shapes or configurations allowing the opposing sealing surfaces to cooperate and form a perimeter seal. For example, the deformable rib 160 may take the form of any of numerous other surface contours adapted to sealingly engage the opposing sheet, both sheets may define one or more like raised and deformable surface portions, or either of the sheets may define such surface portions. Alternatively, one or both polymeric sheets may define a groove, or like recessed peripheral surface portion for receiving an o-ring, gasket or other suitable sealing member to thereby allow the opposing sealing surfaces to cooperate and effect the hermetic peripheral seal.

Figure 20A:
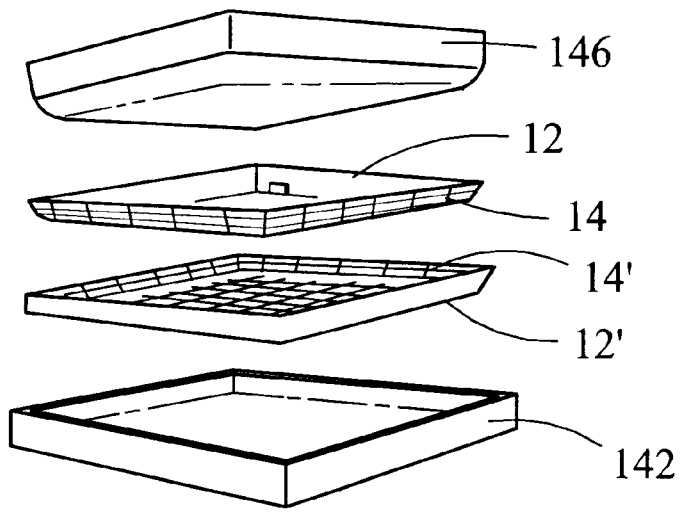
FIG. 20A is a somewhat schematic, exploded perspective view of exemplary polymeric and fibrous layers forming a composite structure of the present invention.
Figure 20B:
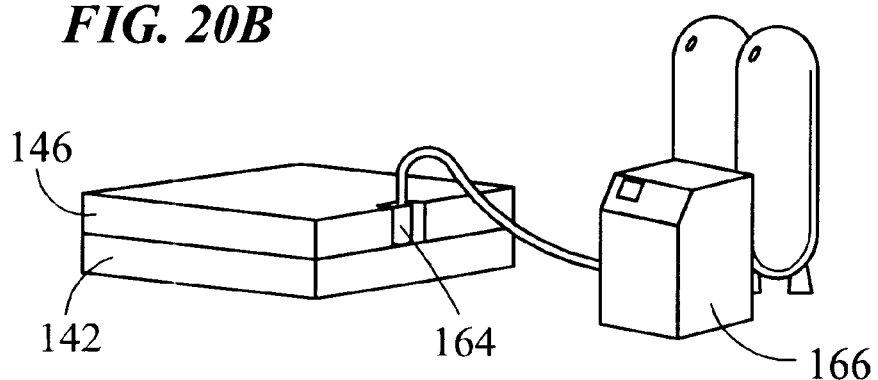
FIG. 20B is a perspective view of a system embodying the present invention for evacuating the mold assembly and introducing the polymeric core material into the cavity formed between the outer polymeric layers.

As shown in FIG. 17B, the polymeric core material 16 is introduced in a resinous character into the cavity 148 through a manifold 164 mounted to the mold 142. As shown in FIG. 20B, the manifold 164 is connected in fluid communication with a delivery system 166. The foam delivery manifold 164 is capable of combining, mixing, and injecting multiple chemicals. Accordingly, a set amount of polymeric core material 16 is delivered in as short a time as possible to thereby substantially reduce cycle time.

As described above, a gate or flow-smoothing device is employed to reduce the turbulence of the polymeric core material 16 upon introduction into the cavity 148. As described above, each polymeric sheet 12, 12' defines a gate 48, 48' for introducing the polymeric core material 16 into the cavity and transitioning the core material from a turbulent to a substantially laminar flow. The first and second mold surfaces 144 and 146, respectively, of the mold assembly 142 each defines a contour or morphology conforming to that of the first or second polymeric sheet 12 and 12', respectively. Accordingly, as shown typically in FIG. 17A, each mold surface defines an inlet port 164, an inlet conduit 167, and a gate 168, each corresponding in shape and location to the inlet ports 50, 50, inlet conduits 52, 52', and gates 48, 48', respectively, of the polymeric sheets described above with reference to FIGS. 5–7. As shown typically in FIG. 17A and described above, the cross-sectional area of each gate 168 progressively increases to thereby increase the cross-sectional area of the flow front in the direction from the injection point to the cavity 148 to reduce the flow velocity and, in turn, transition the flow from a turbulent flow to a substantially laminar flow exiting the gate and entering the cavity formed between the polymeric sheets. As shown typically in FIGS. 18 and 19, the crush rib 160 extends along the periphery of the composite structure 10 outside of the gate, inlet conduit and inlet port to likewise hermetically seal these components from the exterior of the composite structure.

As shown typically in FIGS. 18 and 19, each mold half 144 and 146 defines a plurality of fluid conduits 170 spaced below the mold surfaces 144 and 146 to carry a temperature-controlled fluid through the conduits and thereby maintain the mold surfaces at a predetermined temperature. Each mold half, and in particular, the mold surfaces 144 and 146 are each made of a thermally-conductive material so that the temperatures of these surfaces can be controlled by passing the temperature-controlled fluid through the conduits 170, and also to act as a heat sink to draw heat out of the composite structure during the molding and curing process. In the currently preferred embodiment of the present invention, the mold halves are made of aluminum or like thermally-conductive metal. These relatively hard, thermally-conductive materials tend to be most effective for use in continuous or mass production environments and for consistently producing high-quality parts. However, as may be recognized by those skilled in the pertinent art based on the teachings herein, any of numerous other types of materials that are currently, or later become known, may be equally employed for performing the functions of the metallic mold surfaces disclosed herein.

As also shown typically in FIG. 18, the upper mold half includes a plurality of o-rings or like seals 171 received within corresponding grooves formed around each first vacuum port 150 to maintain a hermetic seal between the mold half and adjacent polymeric sheet. Similarly, as shown in FIG. 19, the upper mold half also includes another o-ring or like seal 172 received within a corresponding groove formed around the inlet port 50 and injection nozzle 164 to further maintain a hermetic seal between the mold and polymeric sheets.

The Polymeric Core Materials

As described above, the polymeric core material 16 exhibits a resinous character upon injection into the mold, and upon exposure to the evacuated cavity immediately transitions to a foamed character. A preferred polymeric core material 16 that is capable of foaming upon encountering reduced pressure includes a resin blend containing a base, reactant, catalysts, cell size regulator, and a blowing agent, all of which are known in the pertinent art. Further, the polymeric core material 16 preferably exhibits a sufficiently low viscosity to allow for rapid expansion upon encountering the reduced pressure of the mold cavity such that manufacturing cycle times are substantially reduced in comparison to prior art processes.

Figure 22:
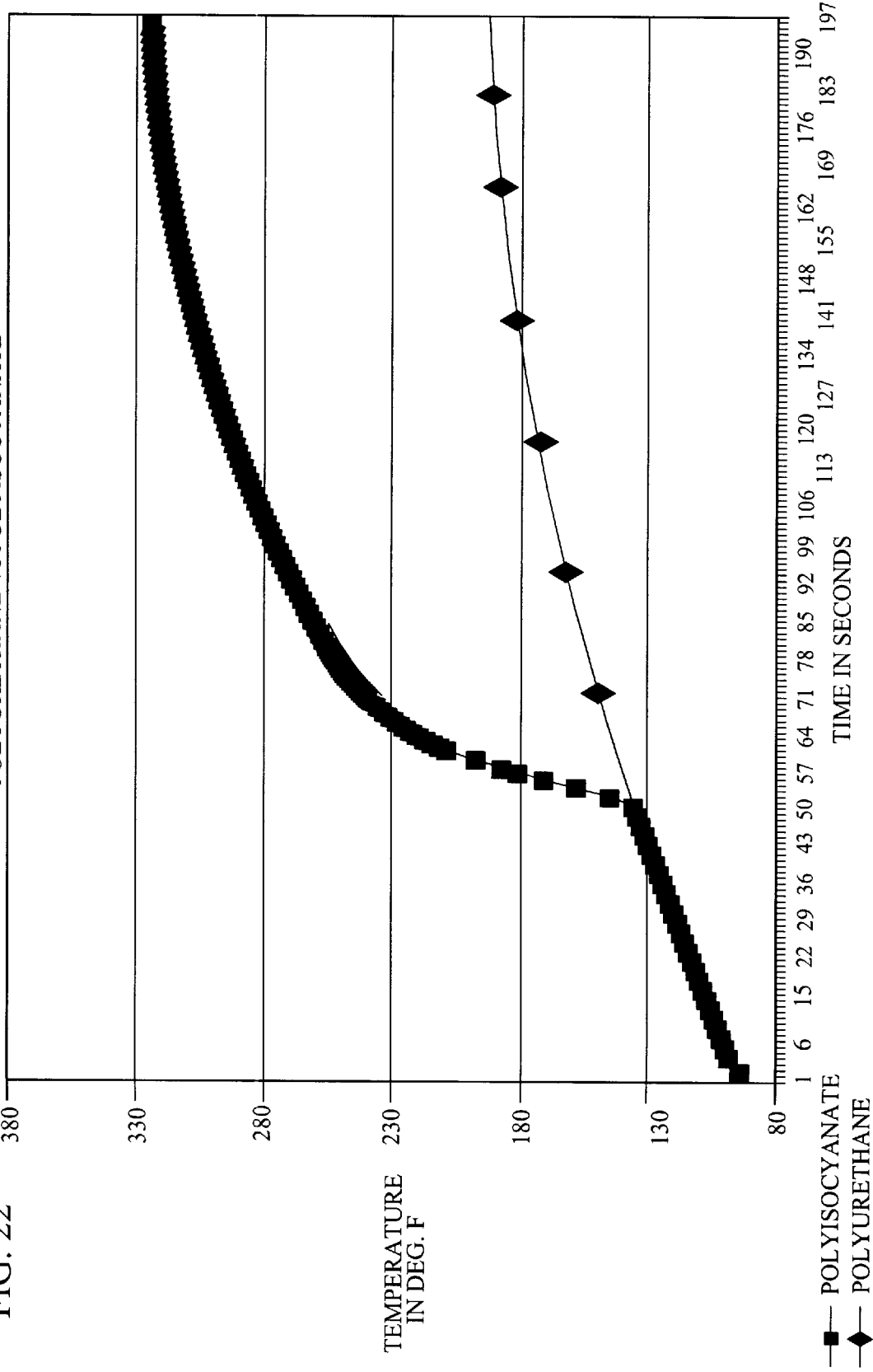
FIG. 22 is a graph illustrating the timing and temperature of the preferred polyisocyanurate core material when undergoing an exothermic reaction upon injection into the core of the composition structure.

Accordingly, the components of the polymeric core material 16 are selected such that upon encountering the reduced pressure in the evacuated cavity 148, the blowing agent begins to boil to thereby pre-expand the polymeric core material from a resinous state to a frothing foam. As indicated in FIG. 22, a preferred polymeric core material 16, described in further detail below, is a polyisocyanurate that is injected in a resinous state into the cavity 148 at about 85° F. When the polymeric core material 16 encounters the vacuum pressure of the cavity 148, the blowing agent immediately commences boiling and, in turn, causes the foaming resin to promptly fill the second region of the cavity formed between the fibrous layers 14, 14'. As further indicated in FIG. 22, in less than approximately one minute, the exothermic reaction produces sufficient heat to raise the temperature of the polymeric core material 16 to about 140° F. and, in turn, activate the latent catalyst and initiate a catalytic reaction within the core material. As a result, substantial heat is then generated as indicated by the upper curve in the FIG. 22. As described above, the catalytic reaction, in combination with the predetermined vacuum maintained within the cavity, creates negative pressure gradients in the direction from an approximate central area of the foamed core 16 toward the fibrous layers 14, 14'. In contrast, and as shown by the lower curve in FIG. 22, typical polyurethane resin reacts at a significantly slower rate than do the preferred core materials of the present invention.

In one embodiment of the present invention, the polymeric core material 16 comprises a foaming polyurethane including a blowing agent and a catalyst that promote the relative reaction rates, as measured by the exothermic behavior. The preferred polyisocyanurate system achieves higher temperatures, at a much faster rate, promoting a faster cure cycle as shown typically in FIG. 22. Preferably, the blowing agent comprises a liquid blowing agent that boils upon encountering reduced pressure such as, for example, upon injection into the mold cavity under vacuum. The liquid blowing agent is not necessarily a low-boiling-point blowing agent, but rather is a blowing agent that boils upon encountering reduced pressure. As is known to those of ordinary skill in the pertinent art, such blowing agents do not provide optimal characteristics for insulation purposes; however, such blowing agents are preferred for use in the present invention for the characteristic described above.

A Preferred Embodiment of the Polymeric Core Material

The process for producing a preferred embodiment of the polymeric core material 16 of the present invention comprises forming a polyurethane foam including:

i. Contacting a polyol mixture, an isocyanate, a blowing agent, and a catalyst to produce a reaction; and ii. Expanding the reaction mixture to produce the polyurethane foam.

The first step in the process of the invention comprises provision of a reaction mixture comprising a polyol mixture, an isocyanate, a blowing agent, and a catalyst. As will be readily understood by one skilled in the pertinent art, the polyol mixture can be a single polyol, or can be a blend of two or more polyols. The exact chemical nature of each polyol is not particularly restricted. For example, the polyol can be made with one or both of ethylene oxide and propylene oxide, and may be a random or block polymer of one or more of polyoxypropylene diols, triols and tetrols, and ethylene oxide-capped diols, triols and tetrols. Generally, if the polyol comprises ethylene oxide, the ethylene oxide will generally be present in amounts of less than about 20% by weight.

The choice of such a polyol is not particularly restricted and is within the purview of a person skilled in the art. For example, the polyol may be a hydroxyl-terminated backbone of a member selected from the group comprising polyether, polyester, polycarbonate, polydiene and polycaprolactone. The polyol may be selected from the group comprising hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkyleneether glycols, polyalkylenearyleneether glycols and polyalkyleneether triols. The polyol also may be selected from the group comprising adipic acid-ethylene glycol polyester, poly(butylene glycol), poly(propylene glycol) and hydroxyl-terminated polybutadiene. See, for example, British Patent No. 1,482,213 and U.S. Pat. No. 4,722,946 to Hostettler, which are each hereby expressly incorporated by reference as part of the present disclosure.

The term "equivalent weight" means mass of active hydrogen-containing compound per reactive hydrogen pursuant to the following formula:

$$\text{Equivalent Weight} = M.W./f$$

wherein M.W. is the molecular weight of the compound and f is the number of reactive hydrogens (i.e. functionality) in a molecule of the compound. Thus, one equivalent weight of active hydrogen-containing compound will react stoichiometrically with one equivalent weight of isocyanate.

Since determining the functionality of the polyol can be complex, an alternative and practical way to determine the equivalent weight of a polyol is pursuant to the following equation:

$$\text{Equivalent Weight} = (56.1 \times 1000)/\text{OH Number}$$

wherein OH Number is the hydroxyl number of the polyol. As is known in the art, hydroxyl number can be measured and provides an indication of the number of hydroxyl groups in the polyol that are available for reaction. As is further known in the art, there are various conventional analytical methods for determining the hydroxyl number of a polyol. See, for example, Chapter 2 of Flexible Foam Fundamentals, Herrington et al. (1991) and the references cited therein, incorporated herein by reference above. These analytical methods include wet analytical and infrared spectroscopic techniques.

The reaction mixture of the present invention further comprises an isocyanate. Of course, those of ordinary skill in the pertinent art will recognize that a mixture of two or more isocyanates may be used. The choice of isocyanate suitable for use in the reaction mixture is generally within the purview of a person skilled in the art. Generally, the isocyanate compound suitable for use may be represented by the general formula: Q(NCO)$_i$ wherein i is an integer of two or more, and Q is an organic radical having the valence of i. Q may be a substituted or unsubstituted hydrocarbon group (e.g. an alkylene or arylene group). Moreover, Q may be represented by the general formula: Q$^1$—Z—Q$^1$ wherein Q$^1$ is an alkylene or arylene group, and Z is chosen from the group comprising —O—, —O—Q$^1$, —CO—, —S—, —S—Q$^1$—S— and —SO$_2$—. Examples of isocyanate compounds which fall within the scope of this definition include hexamethylene diisocyanate, 1,8-diisocyanato-p-methane, xylyl diisocyanate, (OCNCH$_2$CH$_2$CH$_2$OCH$_2$O)$_2$, 1-methyl-2,4-diisocyanatocyclohexane, phenylene diisocyanates, toluene diisocyanates, chlorophenylene diisocyanates, diphenylmethane-4,4'-diisocyanate, naphthalene-1,5- diisocyanate, triphenylmethane-4,4',4"-triisoeyanate and isopropylbenzene-alpha-4-diisocyanate.

In the preferred embodiment, the isocyanate compound suitable for use in the process of the present invention may be selected from dimers and trimers of isocyanates and diisocyanates, and from polymeric diisocyanates having the general formula: $Q"(NCO)_{ij}$ wherein both i and j are integers having a value of 2 or more, and $Q"$ is a polyfunctional organic radical, and/or, as additional components in the reaction mixture, compounds having the general formula: $L(NCO)_I$, wherein i is an integer having a value of 1 or more, and L is a monofunctional or polyfunctional atom or radical. Examples of isocyanate compounds, which fall within the scope of this definition, include ethylphosphonic diisocyanate, phenylphosphonic diisocyanate, compounds that contain a .dbd.Si—NCO group, isocyanate compounds derived from sulfonamides ($QSO_2NCO$), cyanic acid and thiocyanic acid. See also, for example, British Patent No. 1,453,258, which is hereby incorporated by reference as part of the present disclosure.

Non-limiting examples of suitable isocyanates include: 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitoluene diisocyanate, 1,4-xylylene diisocyanate, 1,3-xylylene diisocyanate, bis-(4-isocyanatophenyl) methane, bis-(3-methyl-4-isocyanatophenyl) methane, polymethylene polyphenyl polyisocyanates and mixtures thereof.

A preferred isocyanate is selected from the group comprising 2,4'-diphenylmethane diisocyanate, 4,4'-diphenylmethane diisocyanate and mixtures thereof. A preferred isocyanate of this type is a mixture comprising from about 15 to about 25 percent by weight 2,4'-diphenylmethane diisocyanate and from about 75 to about 85 percent by weight 4,4'-diphenylmethane diisocyanate. Preferably, the isocyanate used in the process of the invention has functionality in the range of from about 2.0 to about 2.7. An example of such an isocyanate is commercially available from the DOW Corporation under the trade name PAPI®27. Another preferred isocyanate of this type is commercially available from BASF Corporation under the trade name Lupranate® MM-103 (a solvent-free, carbodiimide modified 4,4'-diphenylmethane diisocyanate).

The isocyanate preferably is used in an amount to provide an isocyanate index, inclusive of all reactive equivalents in the reaction mixture, in the range of from about 110 to about 500, more preferably from about 130 to about 400, and most preferably from about 150 to about 250.

Reaction of isocyanates with themselves is known as trimerization reaction. This occurs when the isocyanate index in greater than about 100. The trimerization of the isocyanates to prepare the isocyanates having an isocyanurate structure can be carried out at customary temperatures in the presence of known catalysts, for example, phosphines and/or pholine derivatives, amines, alkali metal salts, metal compounds and/or Mannich bases. Trimerized isocyanates containing isocyanurate structures are also commercially available. Isocyanates having biuret structures can be prepared by generally known methods, such as by reaction of the mentioned diisocyanates with water or, for example, diamines, with a urea derivative being formed as an intermediate. Biuretized isocyanates are also commercially available.

As a blowing agent for producing the polyurethane foams, use is made of water, which reacts with isocyanate groups to form carbon dioxide, in an amount of from about 0.1 to about 3% by weight. Carbon dioxide also may be introduced as a direct blowing agent. In addition to the water, it is possible to use further customary blowing agents, such as physically-acting blowing agents. Suitable physically-acting blowing agents are liquids that are inert toward the organic, modified or unmodified polyisocyanates, and have boiling points below about 100° C., preferably below about 50° C., and in particular from about −50° C. to about 30° C., at atmospheric pressure, so that they vaporize under the action of the exothermic polyaddition reaction.

Examples of such preferred liquids are alkanes, such as heptane, hexane, n- and iso-pentane, preferably industrial mixtures of n- and iso-pentanes, n- and iso-butane and propane, cis-2-butene and/or trans-2-butene, cycloalkanes such as cyclopentane and/or cyclohexane, ethers such as furan, dimethyl ether and diethyl ether, ketones such as acetone and methyl ethyl ketone, alkyl carboxylates such as methyl formate, dimethyl oxalate and ethyl acetate, and halogenated hydrocarbons such as customary fluorinated hydrocarbons. It is also possible to use mixtures of these low-boiling liquids with one another and/or with other substituted or unsubstituted hydrocarbons. Further suitable blowing agents are organic carboxylic acids such as formic acid, acetic acid, oxalic acid, ricinoleic acid and carboxyl-containing compounds. The blowing agents are usually added to the compounds that are reactive toward isocyanates and have a molecular weight of from about 400 to about 8000. However, they can be added to the isocyanate component or, as a combination, both to the polyol component and to the isocyanate component or premixtures of these components with the customary formative components.

The reaction mixture of the present invention may further comprise a chain-extending agent. Generally, the chain-extending agent is a compound having at least two functional groups bearing active hydrogen atoms. See, for example, U.S. Pat. No. 4,590,219 to Nissen et al. and U.S. Pat. No. 4,994,502 to Markovs et al., which are each hereby expressly incorporated by reference as part of the present disclosure. Preferably the chain-extending agent is selected from the group consisting of ethylene glycol, diethylene glycol, propylene glycol, 1,4-butanediol and mixtures thereof. The chain-extending agent is preferably used in an amount in the range of from about 1 to about 15, more preferably from about 2 to about 12, and most preferably from about 4 to about 10, parts by weight per one hundred parts by weight of the polyol mixture.

The reaction mixture of the present invention further comprises a primary catalyst and a latent catalyst. The primary catalyst is a blowing-gelation catalyst that is more gel selective than blow selective (i.e., the primary catalyst operates to a greater extent on gelling as opposed to blowing). One reason why the primary catalyst is more gel selective is that the foamed core material must become sufficiently viscous during its rapid expansion and movement through the cavity to prevent it from collapsing to the point where it cannot recover. The latent catalyst is preferably a trimerization catalyst that accelerates the exothermic reaction by causing the isocyanates to react with themselves and, in turn, create heat and pressure within the foamed core (or second region of the cavity).

Accordingly, the catalysts promote reaction of the polyol mixture with the isocyanate. The choice and use of such catalysts are within the purview of a person of ordinary skill in the art. See for example, U.S. Pat. Nos. 4,296,213 and 4,518,778, each of which is hereby expressly incorporated by reference as part of the present disclosure. Suitable catalysts include tertiary amines and/or organometallic compounds. Non-limited examples of useful catalysts for use in the process of the invention may be selected from the group consisting of triethylenediamine, N-methylmorpholine, N-ethylmorpholine, diethanolamine, N-cocomorpholine, 1-methyl-4-dimethylaminoethylpiperazine, methoxypropyldimethylamine, N,N,N'-trimethylisopropyl propylenediamine, 3,-diethylaminopropyldiethylamine, dimethylbenzylamine, dibutyltin dilaurate, dibutyltin diacetate, stannous chloride, dibutyltin di-2-ethyl hexanoate, stannous oxide and mixtures thereof. See, for example, U.S. Pat. No. 4,590,219 Nissen et al., incorporated by reference above, for a discussion of several of these and other suitable catalysts. Preferably, the catalysts are used in an amount in the range of from about 0.20 to about 4.0 parts by weight per one hundred parts by weight of the polyol mixture.

As may be understood by those of ordinary skill in the pertinent art based on the teachings herein, it is contemplated that conventional additives in the polyurethane foam art can be used in the present invention. Non-limiting examples of such additives include: surfactants (e.g. organo-silicone compounds available under the trade name L-540 by Union Carbide), cell openers (e.g. silicone oils), extenders (e.g. halogenated paraffins commercially available as Cereclor S45), cross-linkers (e.g. low molecular weight reactive hydrogen-containing compositions), pigments/dyes, flame retardants (e.g. halogenated organo-phosphoric acid compounds), inhibitors (e.g. weak acids), nucleating agents (e.g. diazo compounds), anti-oxidants, UV stabilizers (e.g. hydroxybenzotriazoles, zinc dibutyl thiocarbamate, 2,6-ditertiary butylcatechol, hydroxybenzophenones, hindered amines and mixtures thereof), plasticizers (e.g. sulfonated aromatic compounds), bacteriostats (e.g. yeast, fungi and mixtures thereof), antistatic agents (e.g. ionizable metal salts, carboxylic acid salts, phosphate esters and mixtures thereof), and mixtures thereof. The amounts of these additives conventionally used are within the purview of a person of ordinary skill in the art. See, for example, Chapter 2 of Flexible Foam Fundamentals, Herrington et al. (1991) and the references cited therein, incorporated by reference above.

The manner by which the polyol mixture, isocyanate, aqueous blowing agent, chain-extending agent and catalysts are contacted in the process of the present invention is not particularly restricted. Thus, it is possible to preblend the components in a separate tank, which is then connected to a suitable mixing device for mixing with the aqueous blowing agent and catalyst. Alternatively, it is possible to preblend the polyol mixture with the blowing agent, catalyst, chain extending agent and other additives, if present. This preblend may then be fed to a suitable mixhead (high pressure or low pressure), which also receives an independent stream of the isocyanate.

Once the polyol mixture, isocyanate, blowing agent, and catalysts have been contacted and, ideally, mixed uniformly, a reaction mixture is formed. This reaction mixture is then expanded to produce the present polyurethane foam. As will be apparent to those of ordinary skill in the art, the process of the present invention is useful in the production of slab foam, molded articles, and the like. Thus, as also will be apparent to a person of ordinary skill in the art, the manner by which expansion of the reaction mixture is effected will be dictated by the type of foam being produced.

Table 1 below provides a description of several embodiments of the polymeric core material 16 of the present invention, including a list of each component and its respective amount.

TABLE 1

| Component | Amount |
|---|---|
| Polymer Polyol | 100–0 parts |
| Polyol | 0–100 parts |
| Crosslinker & Chain Extenders | 0–30 parts/100 parts total polyol |
| Catalysts | 0.1 to 5.0 parts/100 parts total polyol |
| Water | 0–7 parts/100 parts total polyol |
| Silicone Surfactants | 0–5 parts/100 parts total polyol |
| Blowing Agent | 0.2 to 30 parts/100 parts total polyol |
| Isocyanate | Adequate quantity for an index of about 0.8 to 5.0 ratio of NCO equivalents to the equivalents of NCO reactive sites. |
| Polyol (A) | 100 parts |
| Chain-Extender (diethylene glycol) | 5 parts/100 parts total polyol |
| Catalyst (A) | 1 parts/100 parts total polyol |
| Catalyst (B) | 2.5 parts/100 parts total polyol |
| Water | 0.5 parts/100 parts total polyol |
| Silicone Surfactant | 2 parts/100 parts total polyol |
| Blowing Agent (cyclopentane) | 8 parts/100 parts total polyol |
| Isocyanate (Polymeric MDI) | Adequate quantity for an index of 2.0 ratio of NCO equivalents to the equivalents of NCO reactive sites. |
| Polyol (A) | 100 parts |
| Chain-Extender (diethylene glycol) | 5 parts/100 parts total polyol |
| Catalyst (A) | 1 parts/100 parts total polyol |
| Catalyst (B) | 2.5 parts/100 parts total polyol |
| Water | 0.5 parts/100 parts total polyol |
| Silicone Surfactant | 2 parts/100 parts total polyol |
| Blowing Agent (60% iso/40% cyclopentane) | 8 parts/100 parts total polyol |
| Isocyanate (Polymeric MDI) | Adequate quantity for an index of 2.0 ratio of NCO equivalents to the equivalents of NCO reactive sites. |
| Polyol (A) | 100 parts |
| Chain-Extender (diethylene glycol) | 5 parts/100 parts total polyol |
| Catalyst (A) | 1 parts/100 parts total polyol |
| Catalyst (B) | 2.5 parts/100 parts total polyol |
| Water | 0.5 parts/100 parts total polyol |
| Silicone Surfactant | 1 parts/100 parts total polyol |
| Blowing Agent (HCFC-141b) | 12 parts/100 parts total polyol |
| Isocyanate (Polymeric MDI) | Adequate quantity for an index of 2.0 ratio of NCO equivalents to the equivalents of NCO reactive sites. |
| Polyol (A) | 100 parts |
| Chain-Extender (diethylene glycol) | 5 parts/100 parts total polyol |
| Catalyst (A) | 1 parts/100 parts total polyol |
| Catalyst (B) | 2.5 parts/100 parts total polyol |
| Water | 0.5 parts/100 parts total polyol |
| Silicone Surfactant | 1 parts/100 parts total polyol |
| Blowing Agent (HFC-245FA) | 18 parts/100 parts total polyol |
| Isocyanate (Polymeric MDI) | Adequate quantity for an index of 2.0 ratio of NCO equivalents to the equivalents of NCO reactive sites. |

•Polyether Polyols, Rigid Polyols and Polymeric MDI's blends are commercially available from the Dow Corporation.
•Catalysts (A) are blowing-gelation catalysts and Catalysts (B) are trimerization catalysts. These catalysts and the Silicone Surfactants are commercially available from AirProducts and other well-known suppliers of such materials.
•HCFC-141b and HFC-245FA are commercially available from Honeywell.
•Cyclopentane and Iso/Cyclopentane blends are commercially available from EXXON Mobil.

Some of the advantages associated with selecting a polyisocyanurate, a blowing agent, and a catalyst as described above for the polymeric core material 16 include an improved modulus stiffness, a higher glass transition temperature, and a significantly reduced cycle time. As shown in FIG. 22, the polyisocyanurate foam rapidly expands upon injection due to the vacuum drawn within the cavity 148. The evacuated cavity allows the core material to rapidly expand and fill the second region of the cavity, and the latent catalyst creates sufficient heat and pressure to force the resinous core material, while still exhibiting a relatively low dynamic viscosity, into and through the multi-directional fibrous plies, and thereby obtain a relatively rapid and thorough "wet-out" of the fibrous plies. The activation of the latent catalyst also accelerates the exothermic reaction, driving heat and pressure and thereby initiating a rampant cure of the polyisocyanurate foam. As a result, the cycle time associated with injection, expansion, and the cure rate of the polymeric core material is significantly reduced.

Accordingly, another advantage of the present invention is that relatively large, thin-walled composite structures can be formed in a relatively short cycle time. A typical foam system of the prior art involves a relatively slow reaction to push resinous foam throughout a molded shape, using the expansion of the foam itself to further drive the foam throughout the molded shape. This type of prior art process has proven to be ineffective in forming relatively large or complex three-dimensional shapes due to the foaming resin requiring relatively long cycle times and/or substantial pressures to fill the molds. In contrast, by employing the polymeric core materials and vacuum system of the present invention as described above, the foaming resin quickly moves throughout and fills large and/or complex three-dimensional molded shapes, impregnates the multi-directional fibrous layers, and rapidly cures to prevent the collapse of the expanded foam.

The Molding Process

As described above, the two outer polymeric sheets 12, 12' including the fibrous layers 14, 14' adhesively attached thereto are disposed between the opposing mold surfaces 144 and 146 of the mold assembly 142, and are spaced apart from each other to define the cavity 148 therebetween. As also described above, the fibrous layers 14, 14' define the first regions of the cavity located between each fibrous layer and the respective polymeric sheet, and the second region of the cavity located between the fibrous layers. As also described above, the cavity 148 formed between the polymeric sheets 12, 12' is evacuated to create a predetermined vacuum therein. In the currently preferred embodiment of the present invention, the predetermined vacuum of the cavity is within the range of approximately 10 inches Hg through approximately 29 inches Hg. However, as may be recognized by those skilled in the pertinent art, this vacuum range is only exemplary, and other vacuum levels may be employed depending upon the characteristics or requirments of a particular molding system.

Upon evacuating the cavity 148, the core material 16 is introduced in a resinous character by the injection manifold 164 through the inlet port 50, 50', inlet conduit 52, 52', and gate 48, 48', and into the second region of the evacuated cavity. The blowing agent of the core material 16 is then activated by subjecting the core material to the vacuum within the cavity, and the core material in the second region of the cavity is, in turn, converted from a resinous character to a foamed character. Upon substantially filling the second region of the evacuated cavity 148 with the foamed core material, the foamed core material that contacts the fibrous layers 14, 14' is then converted from a foamed character to a substantially resinous character to create a relatively dense, resinous interface between each fibrous layer and the foamed core. In the currently preferred embodiment of the present invention, the fibrous layers 14, 14' and outer polymeric layers 12, 12' are maintained at a temperature within the range of approximately 110° F. through approximately 150° F., and most preferably less than approximately 130° F., during the filling of the second region of the cavity in order to facilitate creating the relatively dense, resinous interface at each fibrous layer. In order to sustain the preferred temperatures of the polymeric and fibrous layers, the molding surfaces 144 and 146 are preferably maintained at a temperature of approximately 120° F. by circulating the temperature-controlled liquid through the conduits 170. In addition, as described above, the molding surfaces act as a heat sink to draw heat out of the composite structure and thereby further maintain and control the preferred temperature gradients during the molding process.

After substantially filling the second region of the cavity 148 with the foamed core material 16, and as described above, the reaction of the latent catalyst is initiated within the foamed core to accelerate the exothermic reaction and cure the foamed core. In addition to the temperature gradients described above, negative pressure gradients also are then created in the direction from the foamed core 16 toward the fibrous layers 14, 14'. In the preferred embodiment of the present invention, the negative pressure gradients are created by maintaining the vacuum in the first regions of the cavity 148 between the fibrous layers 14, 14' and the outer polymeric layers 12, 12', and by increasing the pressure in the foamed core 16 through the catalytic reaction of the core material. Upon expansion of the core material 16 into its foamed state, elevated temperatures of at least about 250° F. are generated in the areas of maximum expansion of the foam, and typically at the central areas of the core 16. The temperature of the core material decreases along gradients extending from the approximate center of the core 16 to the fibrous layers 14, 14'. The negative pressure gradients are used to cause the resinous core material at the interface of each fibrous layer and the foamed core to impregnate (or "wet-out") the fibrous layers and, in turn, substantially fill the first regions of the cavity with the resinous core material. During the filling of the first regions of the cavity, the temperatures of the molding surfaces, and thus of the polymeric and fibrous layers, are maintained within the preferred range described above in order to slow the catalytic reaction in the first region of the cavity to give it time to wet-out the fibrous layer and to cure the core material. Also, if the temperatures of the molding surfaces, or of the polymeric and fibrous layers are too low (i.e., substantially below the preferred range), the polymeric core material may prematurely collapse and create undesirable voids in the composite structure. Accordingly, after penetrating and impregnating the fibrous layers and filling the first regions of the cavity, the resinous core material 16 is then cured to fixedly attach the resinous core material and fibrous layers to the outer polymeric layers.

One advantage of the preferred embodiment of the present invention is that the preferred core material 16 and evacuated cavity 148 result in immediate expansion of the core material upon exposure to the vacuum and, in turn, drive the core material to the fibrous layers to substantially fill the second region of the cavity very quickly. In addition, as the viscosity of the polymeric core material 16 builds due to expansion of the foam, the polymeric core material reaching the relatively cooler fibrous material maintains its lower viscosity and therefore more readily penetrates the fibrous material to, in turn, fully wet out the fibrous material and fill the first regions of the cavity.

Figure 20C:
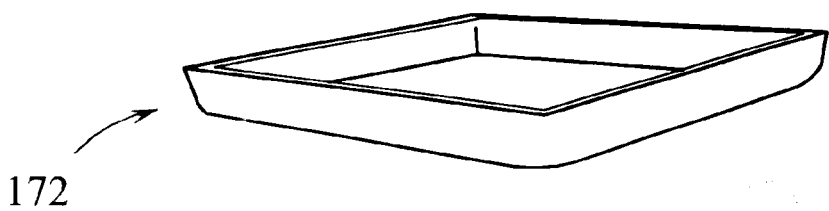
FIG. 20C is a somewhat schematic, perspective view of the layers of FIG. 20A formed into a composite structure embodying the present invention.

After a short period of time, for example, approximately five minutes, the polymeric core material 16, including the resinous urethane elastomer formed between the fibrous material 14 and the polymeric sheet 12, cures, and the finished part 172 cools and can be de-molded as shown in FIG. 20C. The curing of the polymeric core material 16 is primarily achieved as a result of the catalytic reaction accelerating the isocyanate reaction creating the polyisocyanurate foam. However, controlling the temperature of the molding surfaces at approximately 120° F., or otherwise within the preferred range as described above, further promotes relatively rapid curing and cooling of the composite structure, and allows demolding of the composite structure when its surfaces cool to approximately the same temperature.

Composite Structures with Embedded Structural Inserts

Figure 21A:
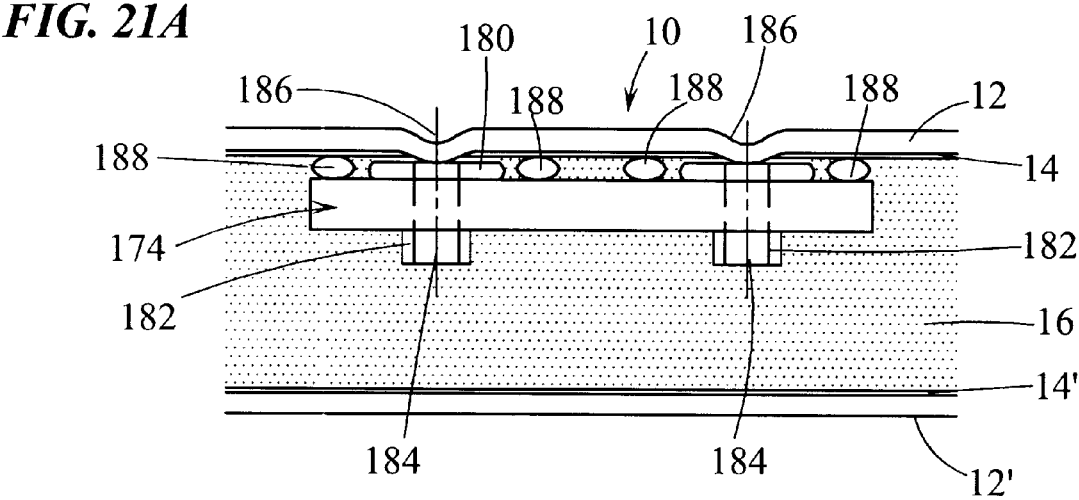
FIG. 21A is a partial, cross-sectional view of another embodiment of a composite structure of the present invention employing a structural insert integrally molded into the composite for fastening other components thereto.
Figure 21B:
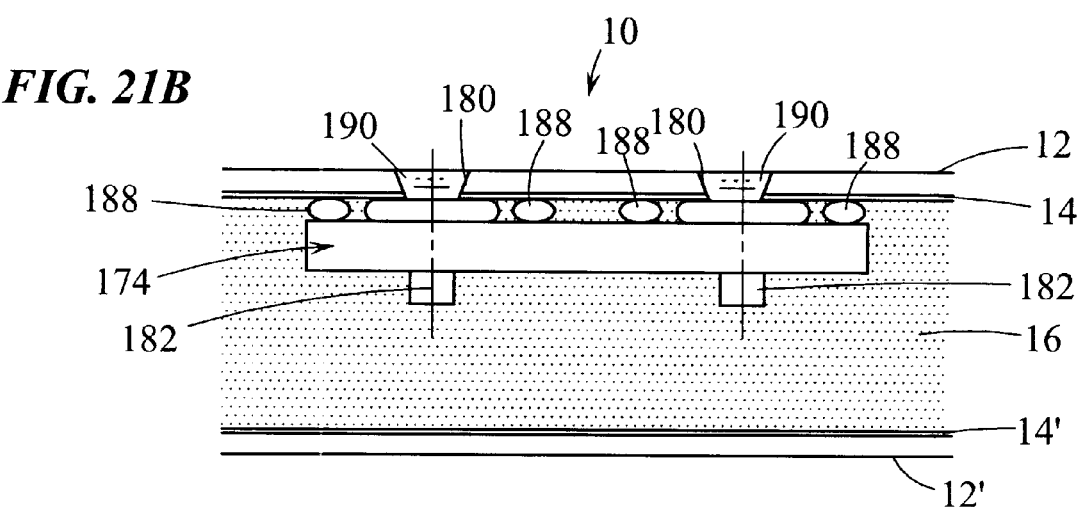
FIG. 21B is a partial, cross-sectional view of another embodiment of a composite structure of the present invention employing a structural insert integrally molded into the composite for fastening other components thereto.
Figure 21C:
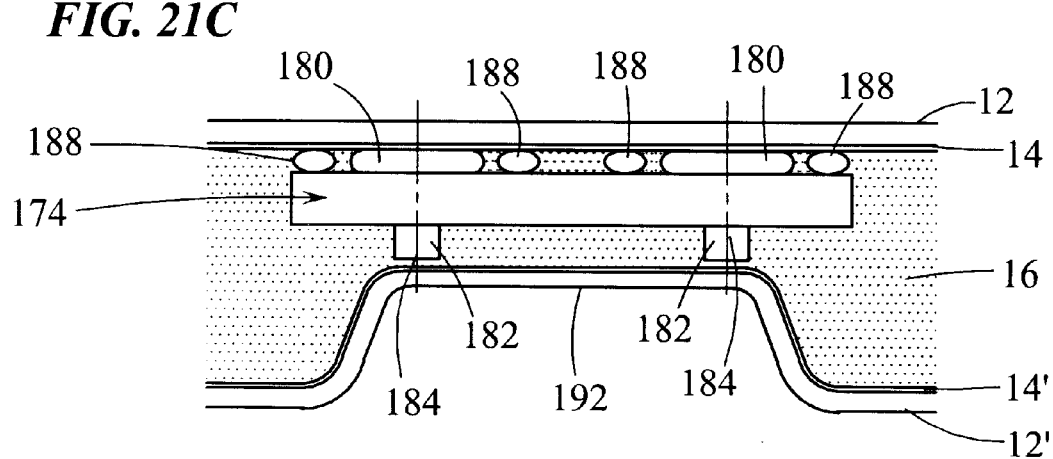
FIG. 21C is a partial, cross-sectional view of another embodiment of a composite structure of the present invention employing a structural insert integrally molded into the composite for fastening other components thereto.

Turning to FIGS. 21A through 21C, a structural insert shown typically at 174, such as a rigid plate, can be embedded within the polymeric core 16 proximate to a respective fibrous layer 14, 14' and polymeric sheet 12, 12' for attaching fasteners or other means for fastening thereto. The structural insert 174 is spaced a predetermined distance from the adjacent polymeric sheet 12, 12'. Upon injection of the polymeric core material 16, the volume created between the structural insert 174 and the polymeric sheet 12, 12' is sufficiently small such that the polymeric core material maintains its resinous character within that volume. Accordingly, the polymeric core material penetrates the fibrous layer 14, 14' located between the structural insert 174 and the adjacent polymeric sheet 12, 12' in the same manner as described above. In addition, because of the relatively small space between the structural insert 174 and adjacent polymeric sheet 12, 12', and relatively reduced temperature in this region during the molding of the part, the core material located throughout the region between the structural insert and adjacent fibrous layer is also maintained in a substantially resinous state to thereby form a relatively dense, resinous layer throughout the region between the structural insert and adjacent polymeric sheet.

Accordingly, the structural inserts 174 are adhesively bonded in place and embedded in a relatively dense core of the polymeric core material 16. Preferably, the structural inserts 174 are secured firmly in place during the molding process to prevent misalignment. Currently preferred methods for securing the structural inserts in place during the molding process include bonding, mechanical fasteners, molding stems in the polymeric sheet, and/or trapping of the structural inserts during the assembly process.

However, as may be recognized by those of ordinary skill in the pertinent art based on the teachings herein, any of numerous other methods or devices that are currently, or later become known, may be equally employed to secure the structural inserts in place during the molding process.

The structural inserts 174 are molded into the composite structure 10 for anchoring or otherwise fixedly securing the composite structure 10 within an assembly, or fixedly securing another object to the composite structure 10. Accordingly, the structural inserts may take any of numerous different shapes or configurations, and may be formed from any of numerous different materials, including metal, ceramic, plastic, or composite materials. In addition, the structural inserts may be of any desired size necessary to meet the requirements of each application. As shown in FIGS. 21A through 21C, each structural insert is in the form of a rectangular steel plate. However, in the embodiment of FIGS. 8 and 12, the structural inserts 174 define an inverted, approximate U-shape corresponding to the shape of a pair of parallel spaced ribs 175 and a groove defined between the ribs. In addition, the composite structures of the present invention may include any desired number of such structural inserts located where necessary to provide attachment points for hardware or other structures or devices. For example, as indicated in FIG. 7, the tonneau 10 described above includes a pair of latches 176 and a handle 178 or other hardware, and as shown typically in FIGS. 8 and 12, a structural insert 174 is embedded in the core below the location of each such piece of hardware to fixedly secure the hardware thereto.

In the embodiment of FIG. 21A, the structural insert 174 is in the shape of a flat plate, and is spaced a predetermined distance from the adjacent polymeric sheet 12, 12' by a pair of washers or like spacers 180. The structural insert 174 further includes a pair of studs 182 projecting through the insert and aligned with each washer 180 to thereby define a mounting aperture 184 extending therethrough. If desired, the polymeric sheet 12, 12' may define a pair of dimples or like protuberances 186 that are adapted to be received within the mounting aperture 184 extending through the washers to locate the structural insert on the polymeric sheet. Each mounting aperture 184 extends through the polymeric sheet in order to receive a fastener or other device for attachment to the insert.

If desired, the mounting apertures 184 may be threaded to receive threaded fasteners or other threaded devices. As shown typically in FIG. 21A, an adhesive is applied at discrete locations between the structural insert 174 and adjacent fibrous layer 14, 14' to temporarily secure the insert in place prior to and during the molding process.

In the currently preferred embodiment of the invention, the adhesive 188 is an acrylic adhesive; however, any of numerous other adhesives or bonding agents may be equally employed. Like the adhesive described above, the adhesive 188 preferably does not wick into or otherwise impregnate the fibrous layer, but rather only temporarily bonds the insert to the fibrous layer prior to and during the molding process and otherwise does not interfere with the permanent bond formed by the resinous core material 16.

In FIGS. 21B and 21C, the structural inserts are essentially the same as disclosed in FIG. 21A, and therefore the same reference numerals are used to indicate like elements. In FIG. 21B, the polymeric sheet 12 does not include the locating dimples 186. Rather, threaded fasteners 190 are received through the mounting apertures 184 to secure the insert in place prior to and during the molding process. Then, once the composite structure is molded, the fasteners 190 can be removed to insert in their place other threaded fasteners or devices for attachment to the composite structure 10. If desired, the adhesive 188 need not be employed. In FIG. 21C, on the other hand, the structural insert 174 may be temporarily secured to the fibrous layer 14 by the adhesive dimples 188, and the second polymeric sheet 12' may define a recessed portion 192 that overlies and is closely spaced adjacent to the stud portions 182 to locate the insert and effectively trap the insert in place during the molding process.

As may be recognized by those skilled in the pertinent art based on the teachings herein, numerous changes and modifications may be made to the above-described and other embodiments of the present invention without departing from its scope as defined in the appended claims. For example, the composite structures may be made with any desired number of polymeric and fibrous layers, the layers may take any of numerous different shapes and configurations, and the layers may be made of any of numerous different materials. In addition, the molding process may be performed at different temperatures and pressures, and/or the steps may occur in different order than described herein. Accordingly, this detailed description of preferred embodiments is to be taken in an illustrative, as opposed to a limiting sense.

What is claimed is:

1. A tonneau for a motor vehicle, comprising:

two molded outer polymeric layers spaced apart from each other and defining a cavity therebetween, wherein each molded outer polymeric layer defines a sealing surface extending about a periphery of the respective layer, and the opposing sealing surfaces cooperate to define a hermetic seal extending about a periphery of the cavity;

at least two multi-directional fiber reinforcement layers, each multi-directional fiber reinforcement layer being mounted adjacent to a respective outer polymeric layer and defining a first region of the cavity extending between each respective outer polymeric layer and adjacent fiber reinforcement layer, and a second region of the cavity extending between the fiber reinforcement layers; and a core located between the two outer polymeric layers and made of a core material capable of exhibiting a foamed character and a resinous character;

wherein the core material includes a resin and a blowing agent activatable upon exposure to a predetermined vacuum pressure within the cavity to convert the core material within the second region of the cavity from a resinous character to a foamed character; and wherein the second region of the cavity is substantially filled with the core material exhibiting the foamed character, each multi-directional fiber reinforcement layer is impregnated with the core material exhibiting a relatively dense, resinous character, and each first region of the cavity is substantially filled with the core material exhibiting a resinous character and fixedly securing the multi-directional fiber reinforcement layers to the outer polymeric layers.

2. A tonneau as defined in claim 1, defining a finished edge extending about a periphery of the tonneau and defining an exposed surface formed by a first one of the polymeric layers, and a trim line spaced laterally inwardly relative to the finished edge and along which the tonneau is trimmed to form a finished part.

3. A tonneau as defined in claim 1, further comprising at least one structural member spaced a predetermined distance from a respective outer polymeric layer and defining a third region of the cavity extending between the respective outer polymeric layer and structural member, and wherein the resinous core material substantially fills the third region to thereby fixedly secure the structural member within the composite structure.

4. A tonneau as defined in claim 1, wherein at least one of the outer polymeric layers is in the form of a multi-layer extrusion including (i) a first layer defining a cosmetic surface, (ii) a second layer defining a core, and (iii) a third layer defining a relatively chemical-resistant surface.

* * * * *

UNITED STATES PATENT AND TRADEMARK OFFICE
CERTIFICATE OF CORRECTION

PATENT NO.   : 6,331,028 B1
DATED        : December 18 2001
INVENTOR(S)  : Michael A. O'Neill et al.

It is certified that error appears in the above-identified patent and that said Letters Patent is hereby corrected as shown below:

<u>Title page,</u>
Item [73] should read as follows:
-- (73) Assignee: Advance USA, LLC, Old Lyme, Ct (US) --

Signed and Sealed this

Sixteenth Day of July, 2002

Attest:

JAMES E. ROGAN
Attesting Officer      Director of the United States Patent and Trademark Office